US011865683B2

(12) United States Patent
Leathrum et al.

(10) Patent No.: US 11,865,683 B2
(45) Date of Patent: Jan. 9, 2024

(54) PUSHER MECHANISM FOR POWERED FASTENER DRIVER

(71) Applicant: MILWAUKEE ELECTRIC TOOL CORPORATION, Brookfield, WI (US)

(72) Inventors: Travis W. Leathrum, Milwaukee, WI (US); Troy C. Thorson, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 127 days.

(21) Appl. No.: 17/313,096

(22) Filed: May 6, 2021

(65) Prior Publication Data

US 2021/0347022 A1 Nov. 11, 2021

Related U.S. Application Data

(60) Provisional application No. 63/020,739, filed on May 6, 2020.

(51) Int. Cl.

*B25C 1/00* (2006.01)
*B25C 1/04* (2006.01)
*B25C 1/06* (2006.01)

(52) U.S. Cl.

CPC .............. *B25C 1/003* (2013.01); *B25C 1/047* (2013.01); *B25C 1/06* (2013.01)

(58) Field of Classification Search

CPC ............ B25C 1/003–006; B25C 1/047; B25C 5/1627; B25B 23/045

See application file for complete search history.

(56) References Cited

U.S. PATENT DOCUMENTS 966,462 A * 8/1910 Jones et al. ........... B25C 5/1627 227/96
1,397,176 A * 11/1921 Muth .................... B25C 5/1627 227/96

(Continued)

FOREIGN PATENT DOCUMENTS

DE 10125846 A1 12/2001
EP 1737621 B1 12/2008

(Continued)

OTHER PUBLICATIONS

Extended European Search Report for Application No. 19785818.6 dated Jan. 28, 2022 (9 pages).

(Continued)

*Primary Examiner* — Joshua G Kotis
(74) *Attorney, Agent, or Firm* — Michael Best & Friedrich LLP

(57) ABSTRACT

A powered fastener driver comprising a housing, a nosepiece coupled to the housing and extending therefrom, a driver blade movable within the nosepiece between a ready position and a driven position, and a pusher mechanism coupled to the nosepiece for individually transferring collated fasteners in a canister magazine to a driver channel in the nosepiece in which the driver blade is movable. The pusher mechanism includes a feeder arm and a linkage positioned between the feeder arm and the driver blade. The feeder arm is engageable with individual fasteners in the nosepiece for sequentially pushing each of the fasteners into the driver channel in response to movement of the feeder arm toward the driver channel. The linkage is movable to advance the feeder arm toward the driver channel in response to contact with the driver blade as the driver blade moves from the driven position toward the ready position.

12 Claims, 21 Drawing Sheets

(56) References Cited

U.S. PATENT DOCUMENTS

| | | | | | |
|---|---|---|---|---|---|
| 1,554,686 | A | * | 9/1925 | Muth | B25C 5/1627<br>227/139 |
| 3,267,616 | A | | 8/1966 | Stade et al. | |
| 3,330,462 | A | | 7/1967 | Colechia et al. | |
| 3,552,627 | A | | 1/1971 | Moreno | |
| 3,554,233 | A | | 1/1971 | Korth | |
| 3,688,966 | A | | 9/1972 | Perkins et al. | |
| 3,961,408 | A | | 6/1976 | Goodsmith et al. | |
| 4,146,071 | A | * | 3/1979 | Mueller | B25B 23/045<br>81/434 |
| 4,389,012 | A | | 6/1983 | Grikis et al. | |
| 4,389,102 | A | | 6/1983 | Grikis et al. | |
| 4,442,965 | A | | 4/1984 | Leistner | |
| 4,463,888 | A | | 8/1984 | Geist et al. | |
| 4,600,135 | A | | 7/1986 | Mukoyama | |
| 4,942,996 | A | | 7/1990 | Wolfberg et al. | |
| 5,038,993 | A | | 8/1991 | Schafer et al. | |
| 5,570,618 | A | | 11/1996 | Habermehl et al. | |
| 5,683,024 | A | | 11/1997 | Eminger et al. | |
| 5,720,423 | A | | 2/1998 | Kondo et al. | |
| 5,855,151 | A | * | 1/1999 | Habermehl | B25B 23/045<br>81/57.37 |
| 5,934,162 | A | * | 8/1999 | Habermehl | F16B 27/00<br>81/434 |
| 5,975,900 | A | | 11/1999 | Garman | |
| 6,109,474 | A | | 8/2000 | Haugen | |
| 6,672,498 | B2 | | 1/2004 | White et al. | |
| 6,966,476 | B2 | | 11/2005 | Jalbert et al. | |
| 7,137,186 | B2 | | 11/2006 | Wojcicki et al. | |
| 7,225,962 | B2 | | 6/2007 | Porth et al. | |
| 7,455,207 | B2 | | 11/2008 | Wojcicki et al. | |
| 7,699,201 | B2 | | 4/2010 | Hagan et al. | |
| 7,866,521 | B2 | | 1/2011 | Gross et al. | |
| 7,950,556 | B2 | | 5/2011 | Hagan | |
| 8,011,441 | B2 | | 9/2011 | Leimbach et al. | |
| 8,051,919 | B2 | | 11/2011 | Hagan et al. | |
| 8,276,798 | B2 | | 10/2012 | Moeller et al. | |
| 8,302,832 | B2 | | 11/2012 | Porth et al. | |
| 8,636,185 | B2 | | 1/2014 | Largo et al. | |
| 8,931,677 | B2 | | 1/2015 | Porth et al. | |
| 10,549,412 | B2 | | 2/2020 | McCardle et al. | |
| 11,413,735 | B2 | * | 8/2022 | Akiba | B25C 1/06 |
| 2003/0230621 | A1 | | 12/2003 | Yamamoto et al. | |
| 2006/0118596 | A1 | | 6/2006 | Wojcicki et al. | |
| 2006/0186171 | A1 | | 8/2006 | Porth et al. | |
| 2006/0283909 | A1 | | 12/2006 | Shima et al. | |
| 2007/0267458 | A1 | | 11/2007 | Chen | |
| 2008/0179372 | A1 | | 7/2008 | Kurth et al. | |
| 2008/0251559 | A1 | | 10/2008 | Uejima et al. | |
| 2009/0114697 | A1 | | 5/2009 | Gross et al. | |
| 2009/0255973 | A1 | | 10/2009 | Tamura et al. | |
| 2010/0176175 | A1 | | 7/2010 | Tamura et al. | |
| 2011/0049215 | A1 | | 3/2011 | McAfee et al. | |
| 2011/0315738 | A1 | | 12/2011 | Liu et al. | |
| 2012/0318550 | A1 | | 12/2012 | Tanimoto et al. | |
| 2016/0023342 | A1 | | 1/2016 | Koenig et al. | |
| 2016/0333964 | A1 | | 11/2016 | Scekic et al. | |
| 2017/0239800 | A1 | | 8/2017 | Moore et al. | |
| 2017/0361444 | A1 | | 12/2017 | Namouz | |
| 2019/0314967 | A1 | | 10/2019 | Garces et al. | |
| 2020/0189080 | A1 | | 6/2020 | Aizawa et al. | |
| 2020/0306941 | A1 | * | 10/2020 | Akiba | B25C 1/04 |

FOREIGN PATENT DOCUMENTS

| | | | |
|---|---|---|---|
| JP | S5356182 | U | 5/1978 |
| JP | S54133681 | A | 10/1979 |
| JP | S54133682 | A | 10/1979 |
| JP | S54136477 | A | 10/1979 |
| JP | S54136478 | A | 10/1979 |

OTHER PUBLICATIONS

International Search Report and Written Opinion for Application No. PCT/US2021/031018 dated Sep. 3, 2021 (15 pages).

Stanley, "Bostitch CRN38K Cordless Roofing Nailer," <http://www.bostitch.com:80/default.asp?CATEGORY=BOS_ROOFING_NAILER_STAPLER&TYPE=PRODUCT&PARTNUMBER=CRN38K&SDesc=Industrial+Cordless+Roofing+Nailer> Webpage available as early as Aug. 19, 2003, 1 page.

Stanely, "The Stanley Works 2000 Annual Report," <http://media.corporate-ir.net/media_files/NYS/SWK/reports/Stanley_AR2000.pdf> 2001, 31 pages.

Eakes, "How do they test power nailers in the factory?" <https://www.joneakes.com/jons-fixit-database/1130-How-do-they-test-power-nailers-in-the-factory.pdf> published Jan. 14, 2001, 1 page.

Stanley, "Bostitch Contruction Tools and Fasteners Catalog," <http://manualzz.com/doc/1349102/construction-staplers> 2001, 60 pages.

Stanley, "Bostitch CRN38K Cordless Roofing Nailer Manual," <http://ec1.images-amazon.com/media/i3d/01/A/man-migrate/MANUAL000004903.pdf> 2000, 10 pages.

Milwaukee Electric Tool, "Coil Roofing Nailer Service Parts List," 2015, 4 pages.

International Search Report and Written Opinion for Application No. PCT/US2019/026043 dated Jul. 23, 2019 (11 pages).

* cited by examiner

PUSHER MECHANISM FOR POWERED FASTENER DRIVER

CROSS-REFERENCE TO RELATED APPLICATIONS

This application claims priority to U.S. Provisional Patent Application No. 63/020,739 filed on May 6, 2020, the entire contents of which are incorporated herein by reference.

FIELD OF THE INVENTION

The present invention relates to powered fastener drivers, and more specifically to pusher mechanisms for powered fastener drivers.

BACKGROUND OF THE INVENTION

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation.

SUMMARY OF THE INVENTION

The present invention provides, in one aspect, a powered fastener driver comprising a housing, a nosepiece coupled to the housing and extending therefrom, a driver blade movable within the nosepiece between a ready position and a driven position, a canister magazine coupled to the nosepiece in which collated fasteners are receivable, and a pusher mechanism coupled to the nosepiece for individually transferring collated fasteners in the canister magazine to a driver channel in the nosepiece in which the driver blade is movable. The pusher mechanism includes a feeder arm and a linkage positioned between the feeder arm and the driver blade. The feeder arm is engageable with individual fasteners in the nosepiece for sequentially pushing each of the fasteners into the driver channel in response to movement of the feeder arm toward the driver channel. The linkage is movable to advance the feeder arm toward the driver channel in response to contact with the driver blade as the driver blade moves from the driven position toward the ready position.

The present invention provides, in one aspect, a powered fastener driver comprising a housing, a nosepiece coupled to the housing and extending therefrom, and a driver blade movable within the nosepiece between a ready position and a driven position. The driver blade includes a surface and a fin extending from the surface. The powered fastener driver also includes a canister magazine coupled to the nosepiece in which collated fasteners are receivable, and a pusher mechanism coupled to the nosepiece for individually transferring collated fasteners in the canister magazine to a driver channel in the nosepiece in which the driver blade is movable. The pusher mechanism includes a feeder arm and a linkage positioned between the feeder arm and the driver blade. The feeder arm is engageable with individual fasteners in the nosepiece for sequentially pushing each of the fasteners into the driver channel in response to movement of the feeder arm toward the driver channel. The linkage includes a first member and a second member pivotably coupled to the first member by a floating pivot point. The linkage is movable to advance the feeder arm toward the driver channel in response to contact with the driver blade as the driver blade moves from the driven position toward the ready position. The floating pivot point is selectively movable relative to the housing by engagement between the fin and the linkage as the driver blade moves from the driven position toward the ready portion thereby causing movement of the linkage.

The present invention provides, in another aspect, a powered fastener driver comprising a housing, a nosepiece coupled to the housing and extending therefrom, a driver blade movable within the nosepiece between a ready position and a driven position, a piston coupled to the driver blade for movement therewith, a bumper against which the piston is abutted when the driver blade is in the driven position, a canister magazine coupled to the nosepiece in which collated fasteners are receivable, and a pusher mechanism coupled to the nosepiece for individually transferring collated fasteners in the canister magazine to a driver channel in the nosepiece in which the driver blade is movable. The pusher mechanism includes a feeder arm and a push arm coupled for movement with the bumper. The feeder arm is engageable with individual fasteners in the nosepiece for sequentially pushing each of the fasteners into the driver channel in response to movement of the feeder arm toward the driver channel. The push arm is movable to advance the feeder arm toward the driver channel in response to contact between the piston and the bumper when the driver blade reaches the driven position.

The present invention provides, in another aspect, a powered fastener driver comprising a housing, a nosepiece coupled to the housing and extending therefrom, a driver blade movable within the nosepiece between a ready position and a driven position, a canister magazine coupled to the nosepiece in which collated fasteners are receivable, and a pusher mechanism coupled to the nosepiece for individually transferring collated fasteners in the canister magazine to a driver channel in the nosepiece in which the driver blade is movable. The pusher mechanism includes a feeder arm that is engageable with individual fasteners in the nosepiece for sequentially pushing each of the fasteners into the driver channel and a pivot arm positioned between the feeder arm and the driver blade. The pivot arm is movable to advance the feeder arm toward the driver channel in response to contact with the driver blade as the driver blade moves from the ready position toward the driven position.

The present invention provides, in another aspect, a powered fastener driver comprising a housing, a nosepiece coupled to the housing and extending therefrom, a driver blade movable within the nosepiece between a ready position and a driven position, a piston coupled to the driver blade for movement therewith, a driver cylinder within which the piston is movable, a storage chamber cylinder containing pressurized gas therein and in fluid communication with the driver cylinder, the pressurized gas acting on the piston to bias the driver blade toward the driven position, a canister magazine coupled to the nosepiece in which collated fasteners are receivable, and a pusher mechanism coupled to the nosepiece for individually transferring collated fasteners in the canister magazine to a driver channel in the nosepiece. The pusher mechanism includes a feeder arm that is engageable with individual fasteners in the nosepiece for sequentially pushing each of the fasteners into the driver channel in response to movement of the feeder arm toward the driver channel and a pneumatic cylinder. The pneumatic cylinder includes a plunger movable between a retracted position and an extended position. The feeder arm is coupled to the plunger for movement therewith. The plunger is movable to advance the feeder arm toward the driver channel in response to an exchange of pressurized gas with the storage chamber cylinder.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
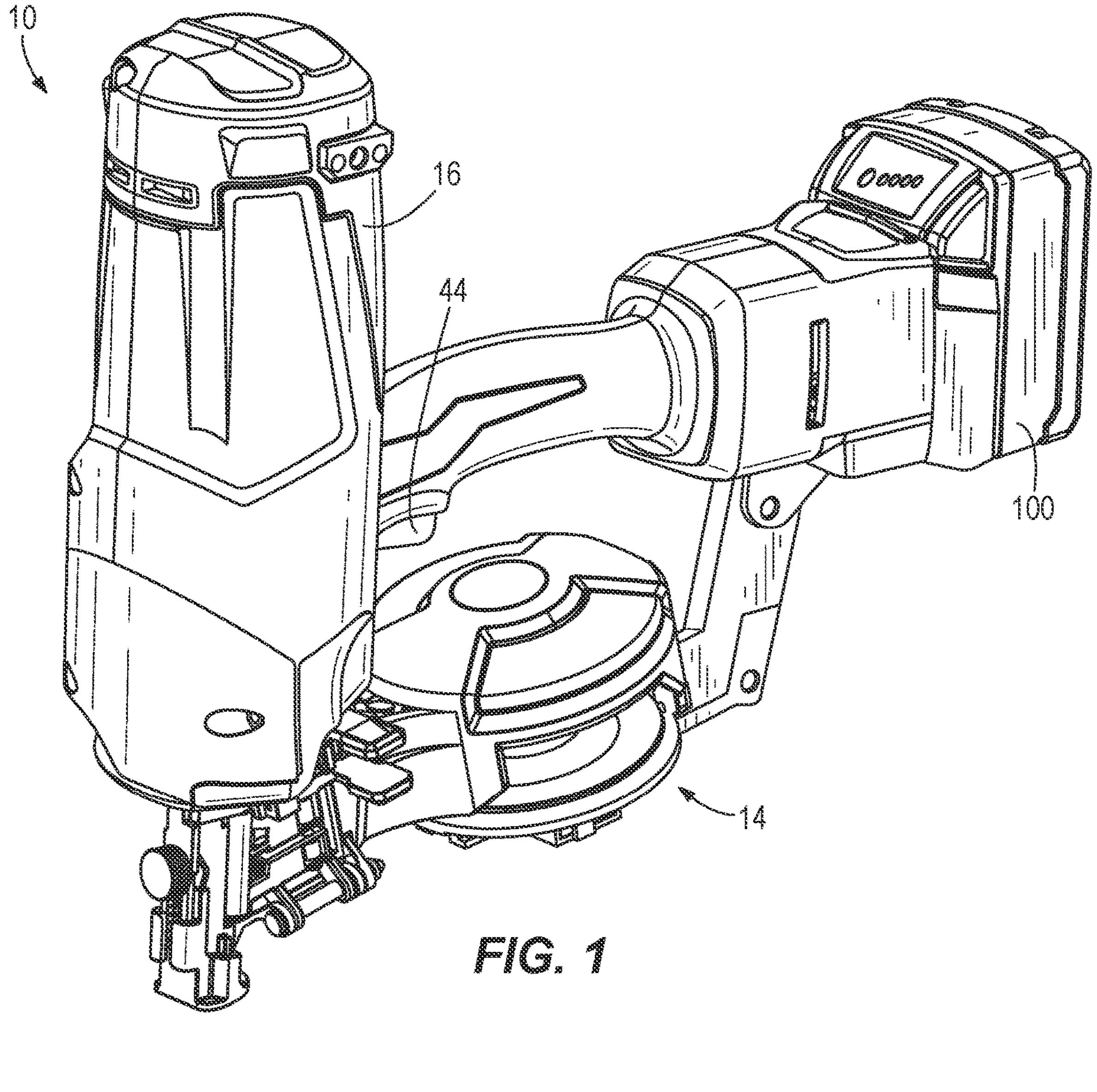
FIG. 1 is a perspective view of a powered fastener driver in accordance with an embodiment of the invention.
Figure 2:
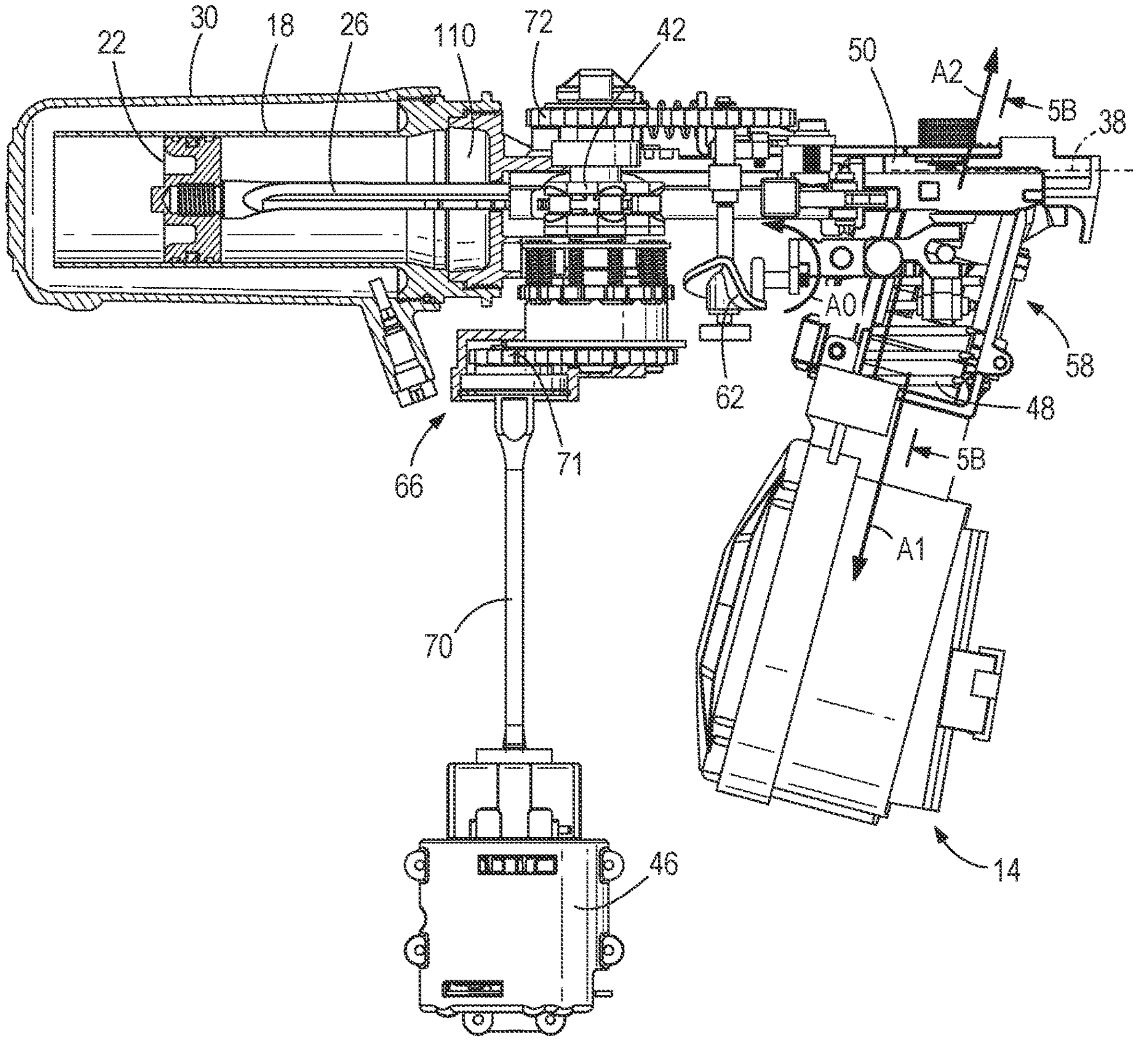
FIG. 2 is a plan view of the fastener driver of FIG. 1, with the housing removed, illustrating a pusher mechanism.

With reference to FIGS. 1 and 2, a gas spring-powered fastener driver 10 is operable to drive fasteners (e.g., nails) held within a canister magazine 14 into a workpiece. The fastener driver 10 includes a housing 16, a cylinder 18 positioned within the housing 16, and a moveable piston 22 positioned within the cylinder 18. The fastener driver 10 further includes a driver blade 26 that is attached to the piston 22 and moveable therewith. The fastener driver 10 does not require an external source of air pressure, but rather includes a storage chamber cylinder 30 of pressurized gas in fluid communication with the cylinder 18. In the illustrated embodiment, the cylinder 18 and moveable piston 22 are positioned within the storage chamber cylinder 30.

With reference to FIG. 2, the cylinder 18 and the driver blade 26 define a driving axis 38, and during a driving cycle the driver blade 26 and piston 22 are moveable between a top dead center ("TDC") position and a bottom dead center ("BDC") or "driven" position. The fastener driver 10 further includes a lifting mechanism 42, which is powered by a motor 46, and which is operable to move the driver blade 26 from the BDC position toward the TDC position.

In operation, the lifting mechanism 42 drives the piston 22 and the driver blade 26 toward the TDC position by energizing the motor 46. As the piston 22 and the driver blade 26 are driven toward the TDC position, the gas above the piston 22 and the gas within the storage chamber cylinder 30 is compressed. Just prior to reaching the TDC position, the motor 46 is deactivated, stopping the piston 22 and the driver blade 26 in a "ready" position where the piston 22 and driver bale 26 are held until released by user activation of a trigger 44. When released, the compressed gas above the piston 22 and within the storage chamber 30 drives the piston 22 and the driver blade 26 to the BDC position, thereby driving a fastener into a workpiece. The illustrated fastener driver 10 therefore operates on a gas spring principle utilizing the lifting mechanism 42 and the piston 22 to further compress the gas within the cylinder 18 and the storage chamber cylinder 30.

Figure 3:
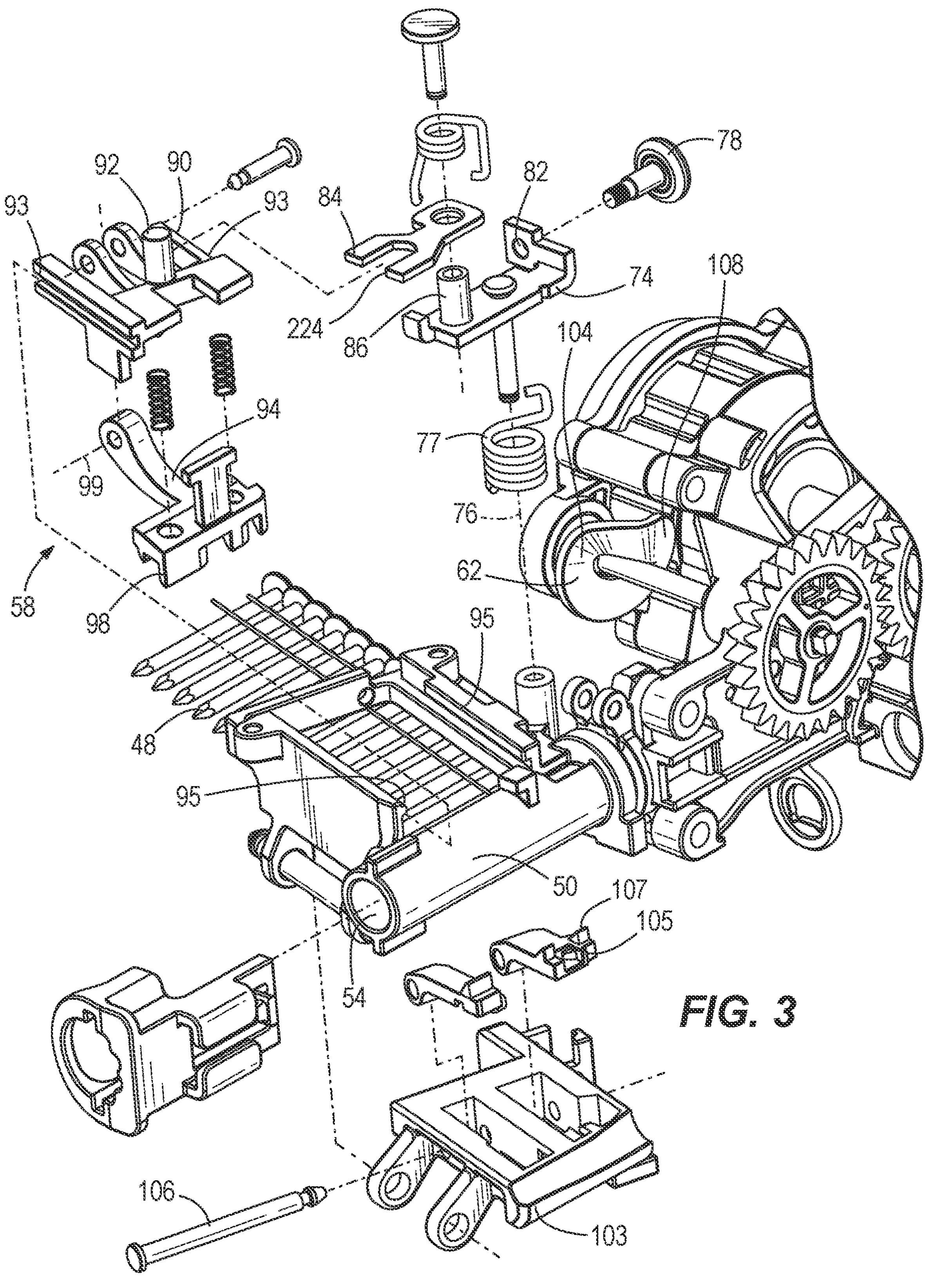
FIG. 3 is an exploded front perspective view of the pusher mechanism of FIG. 2.
Figure 4:
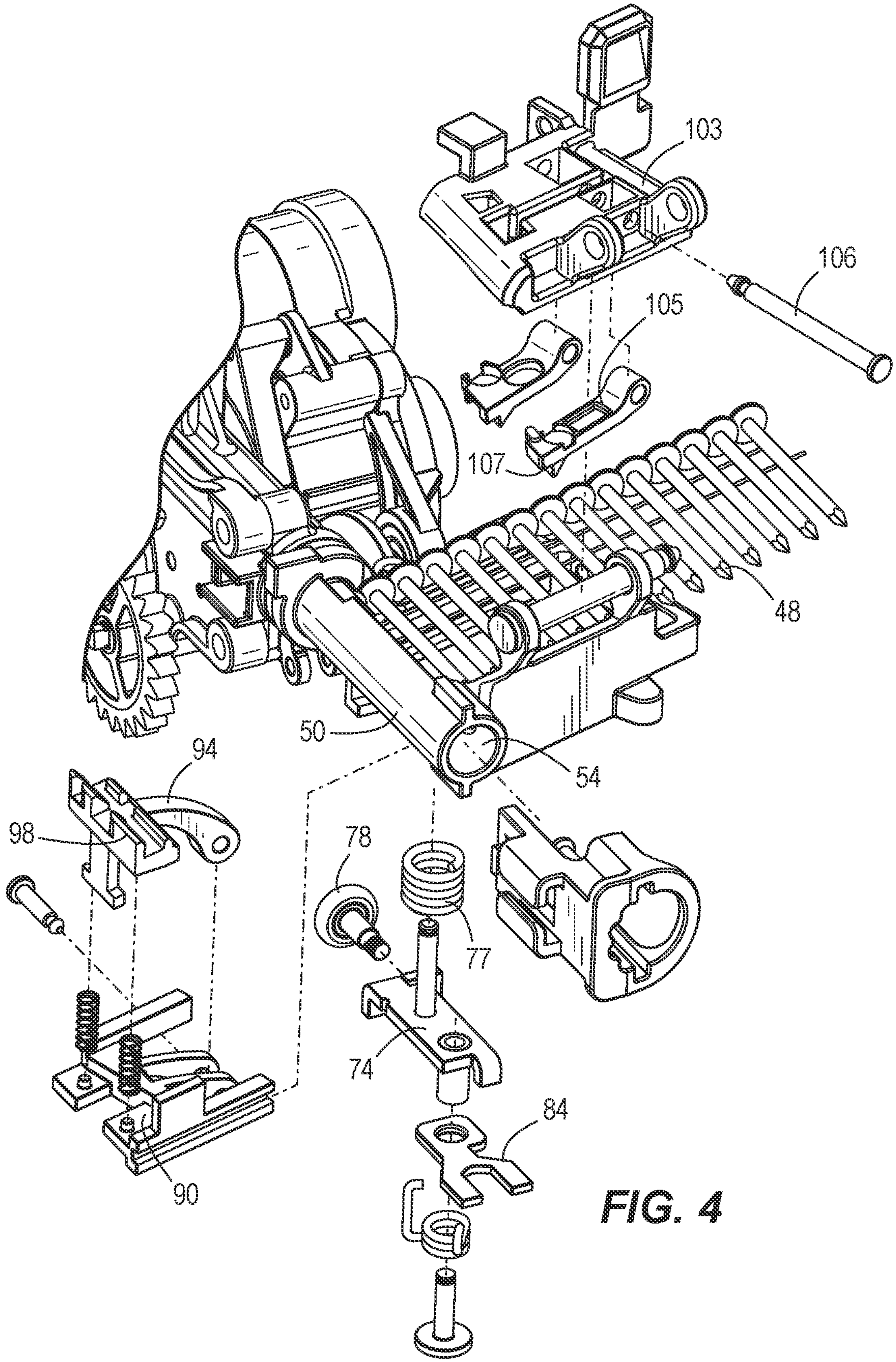
FIG. 4 is another exploded front perspective view of the pusher mechanism of FIG. 2.

The canister magazine 14 includes collated fasteners 48 arranged in a coil. The magazine 14 is coupled to a nosepiece 50 in which the fasteners 48 are received (FIGS. 3-4). The fasteners 48 are sequentially transferred or loaded from the magazine 14 to a driver channel 54 in the nosepiece 50 by a pusher mechanism 58. After the fastener 48 is inserted into the driver channel 54, the driver blade 26 is movable within the driver channel 54 to discharge the fastener 48 into a workpiece.

With reference to FIGS. 2 and 3, the pusher mechanism 58 is driven in sync with the lifting mechanism 42 by a gear train 66 coupled to a transmission output shaft 70 and a cam 62 that receives torque from the gear train 66, causing the cam 62 to rotate in unison with the lifting mechanism 42. The gear train 66 consists of a first gear set 71 on the nosepiece 50 are received. The motion of the sliding body 90 is constrained to reciprocating linear movement in the direction of arrows A1, A2 (shown in FIG. 2) that are parallel with the guide rails 95 relative to the magazine 14.

The pusher mechanism 58 further includes a feeder arm 94 that is pivotably coupled to the sliding body 90 about a pivot axis 99 that is perpendicular to the direction of movement of the sliding body 90 along arrows A1, A2. Because the feeder arm 94 is supported upon the sliding body 90, the feeder arm 94 reciprocates with the sliding body 90 in the direction of arrows A1, A2 in response to reciprocating pivoting movement of a lever 74.

Figure 5A:
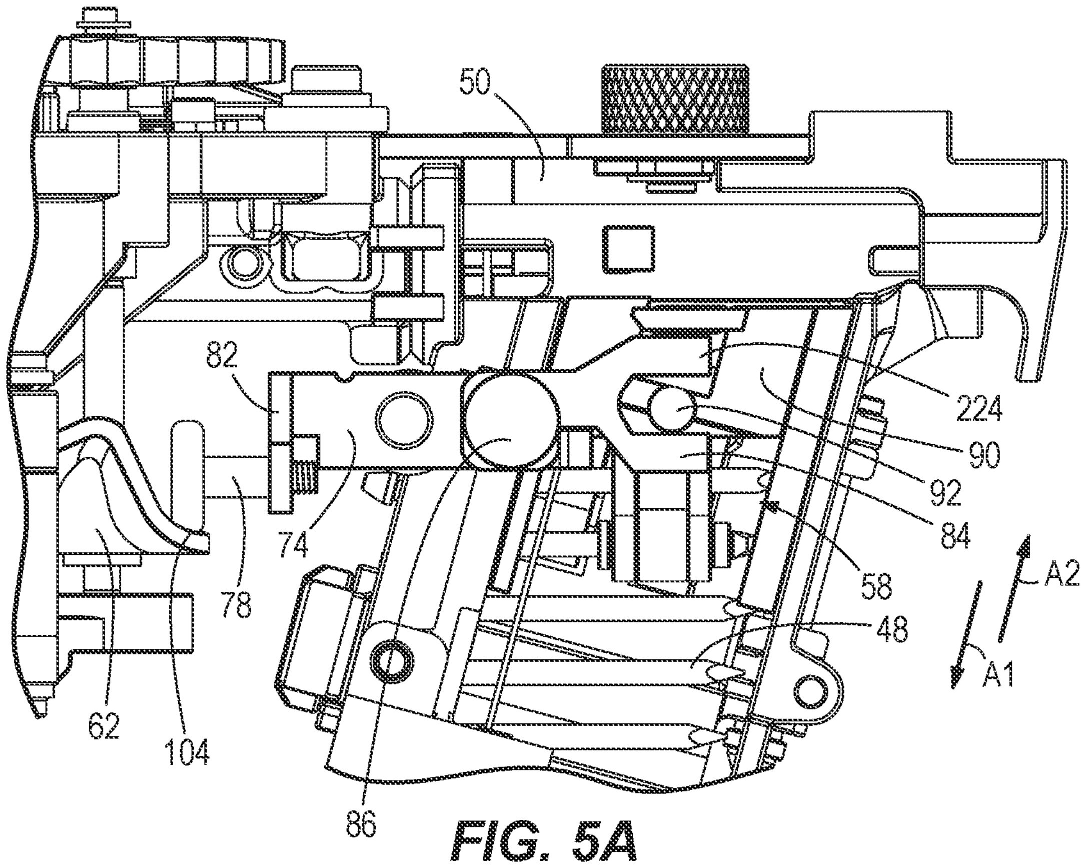
FIG. 5A is a plan view of the pusher mechanism of FIG. 2 at the beginning of a firing cycle.
Figure 5B:
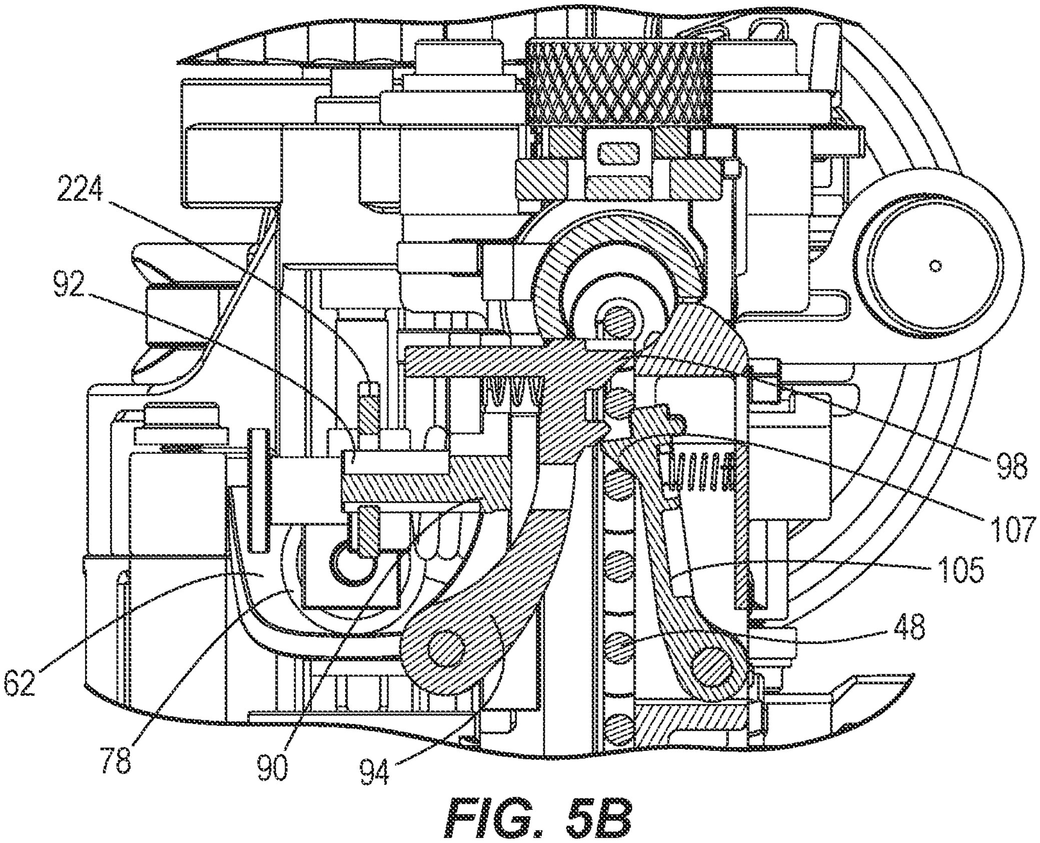
FIG. 5B is a cross-sectional view of the pusher mechanism of FIG. 5A at the beginning of a firing cycle.

Prior to initiation of a firing cycle, a forward-most fastener 48 is positioned in the driver channel 54, the sliding body 90 is located in a forward-most position relative to the nosepiece 50, and the feeder arm 94 is pivoted to an inboard position to thereby receive one of the fasteners 48 behind the forward-most fastener 48 in aligned notches 98 in the feeder arm 94 (FIGS. 4 and 5B). The forward-most position of the sliding body 90 coincides with the roller 78 being in contact with a valley 104 on the cam 62 (shown in FIG. 2).

Figure 6A:
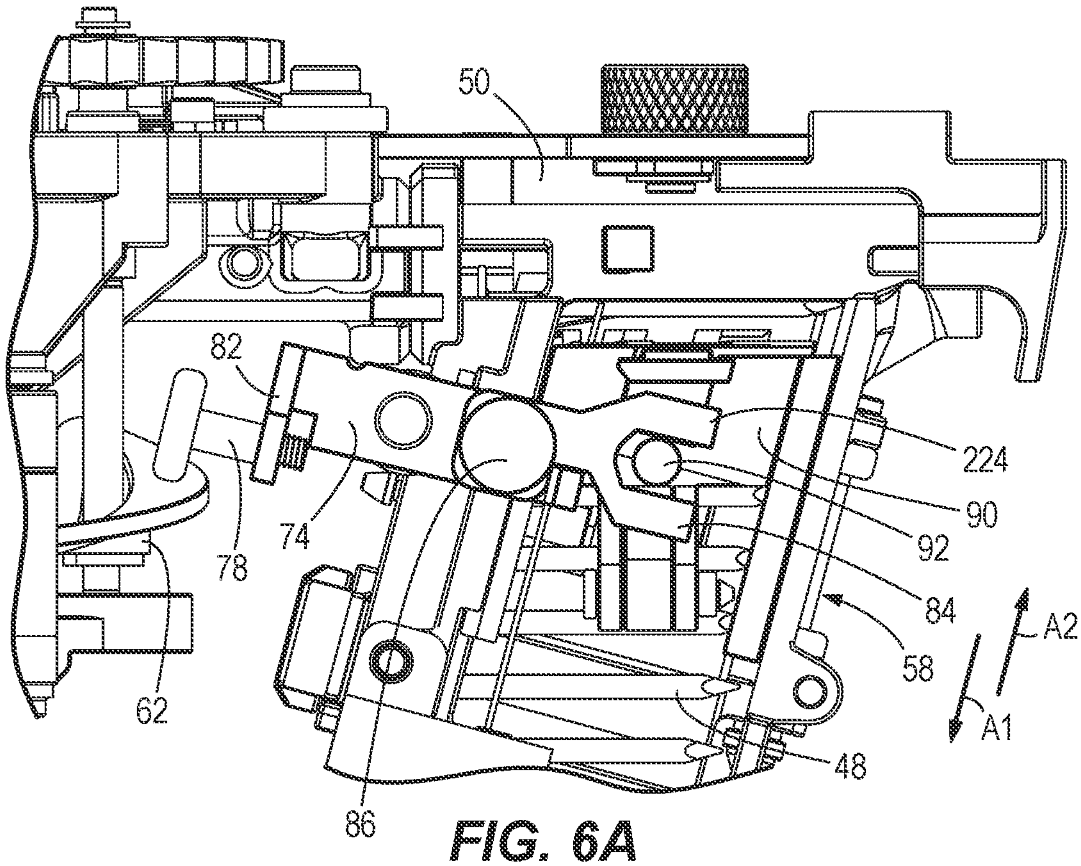
FIG. 6A is a plan view of the pusher mechanism of FIG. 2 during the firing cycle.
Figure 6B:
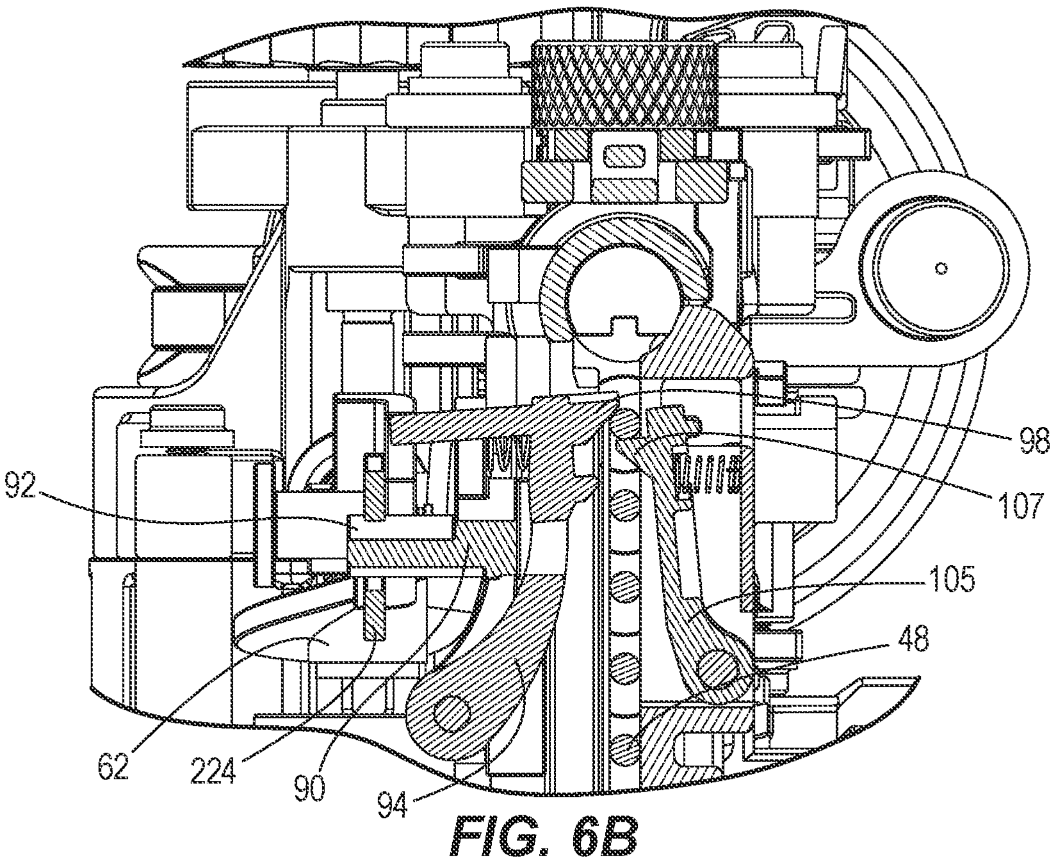
FIG. 6B is a cross-sectional view of the pusher mechanism of FIG. 6A during the firing cycle.
Figure 7A:
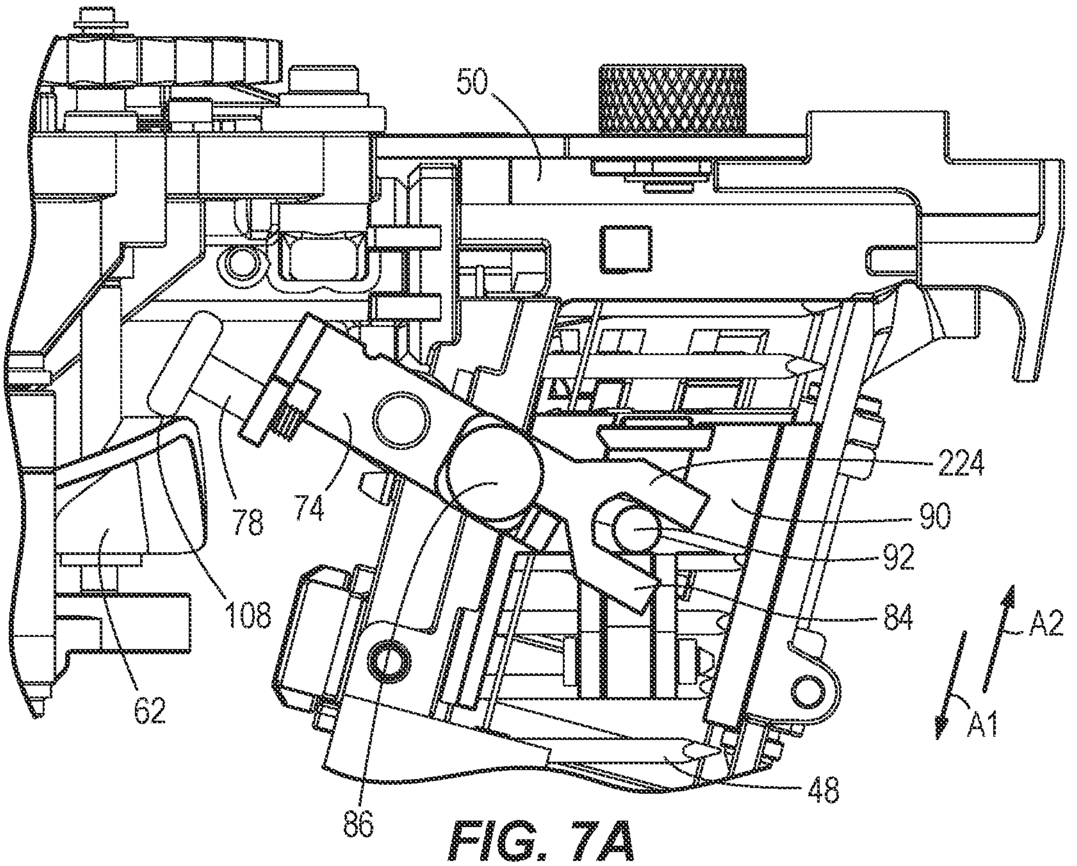
FIG. 7A is a plan view of the pusher mechanism of FIG. 2 during the firing cycle.
Figure 7B:
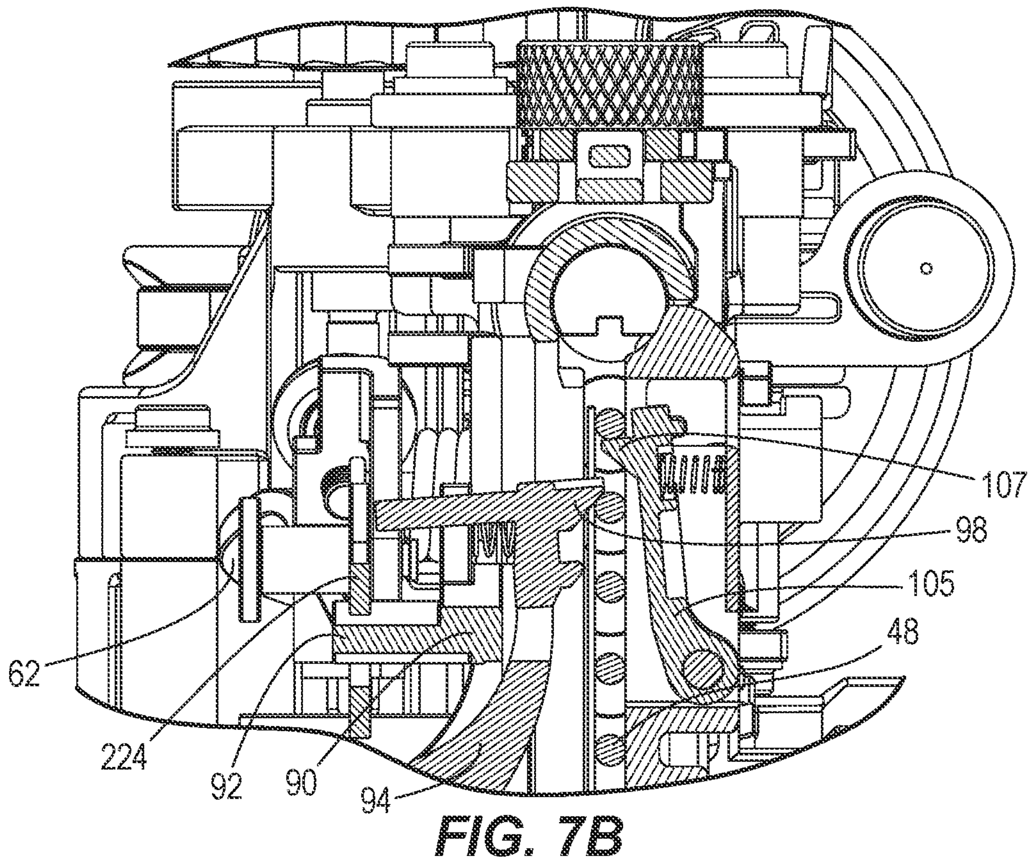
FIG. 7B is a cross-sectional view of the pusher mechanism of FIG. 7A during the firing cycle.
Figure 8A:
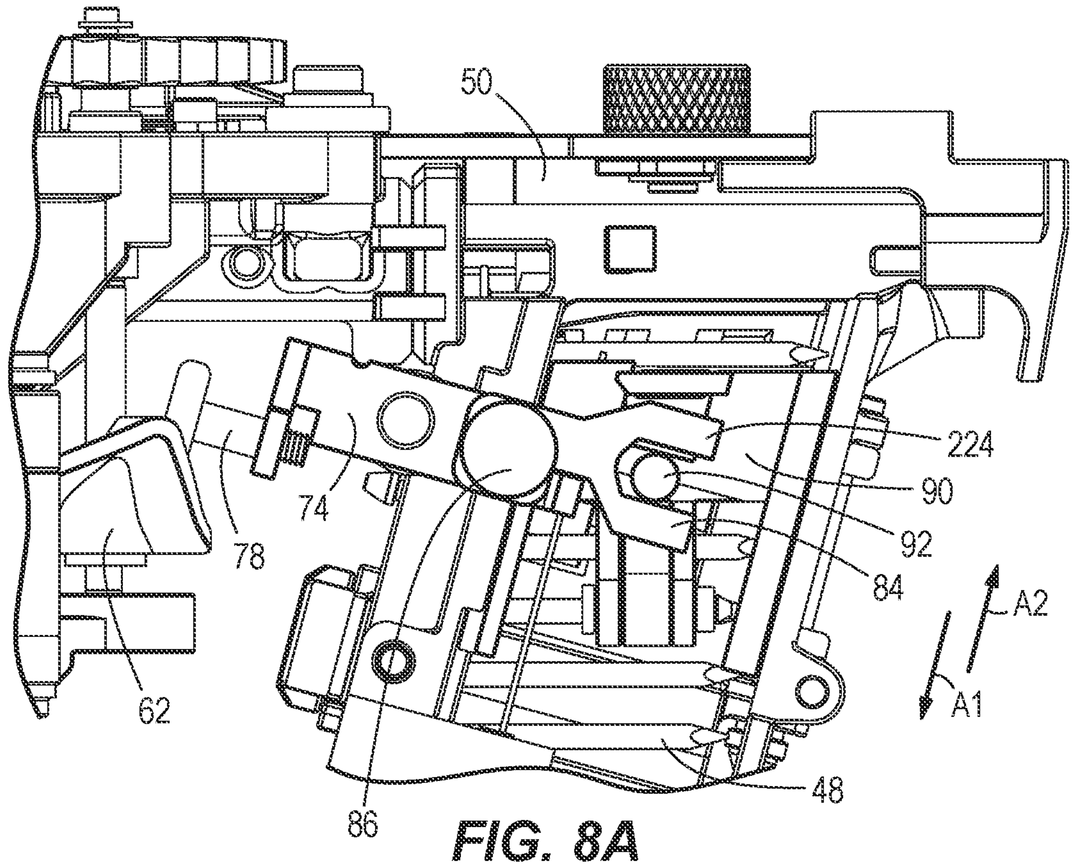
FIG. 8A is a plan view of the pusher mechanism of FIG. 2 at the end of the firing cycle.
Figure 8B:
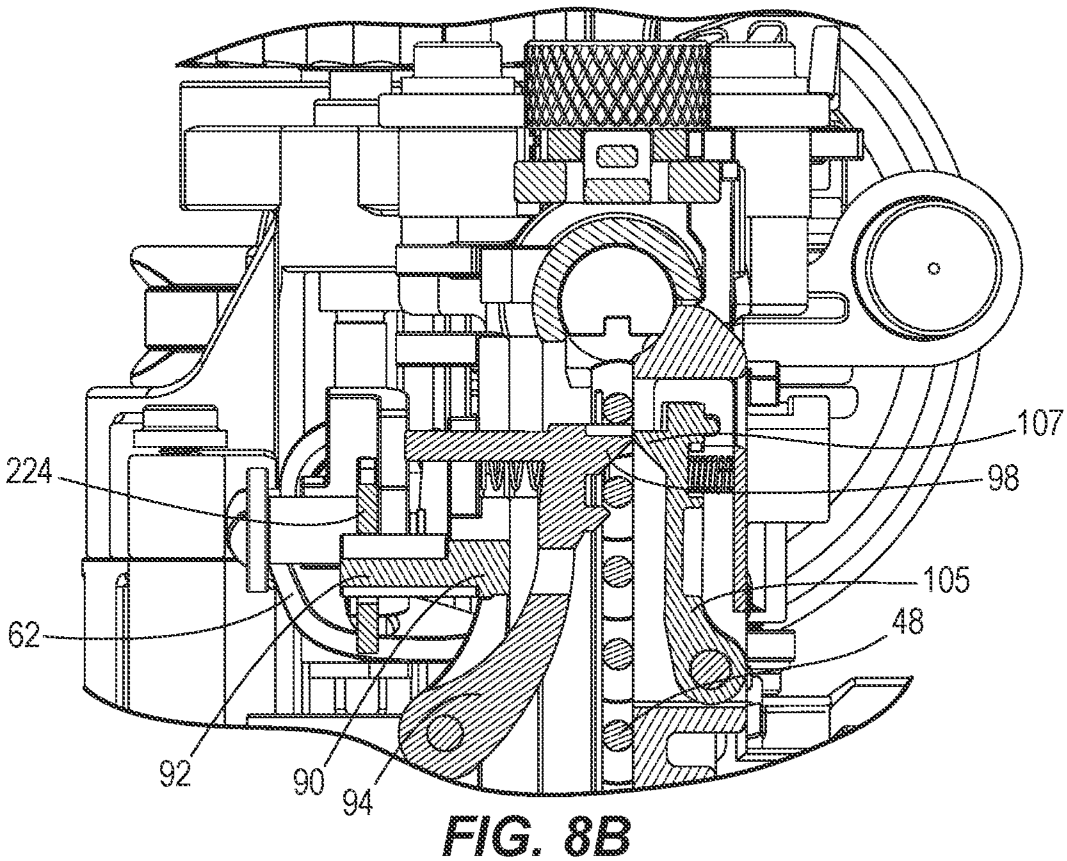
FIG. 8B is a cross-sectional view of the pusher mechanism of FIG. 8A at the end of the firing cycle.
Figure 9:
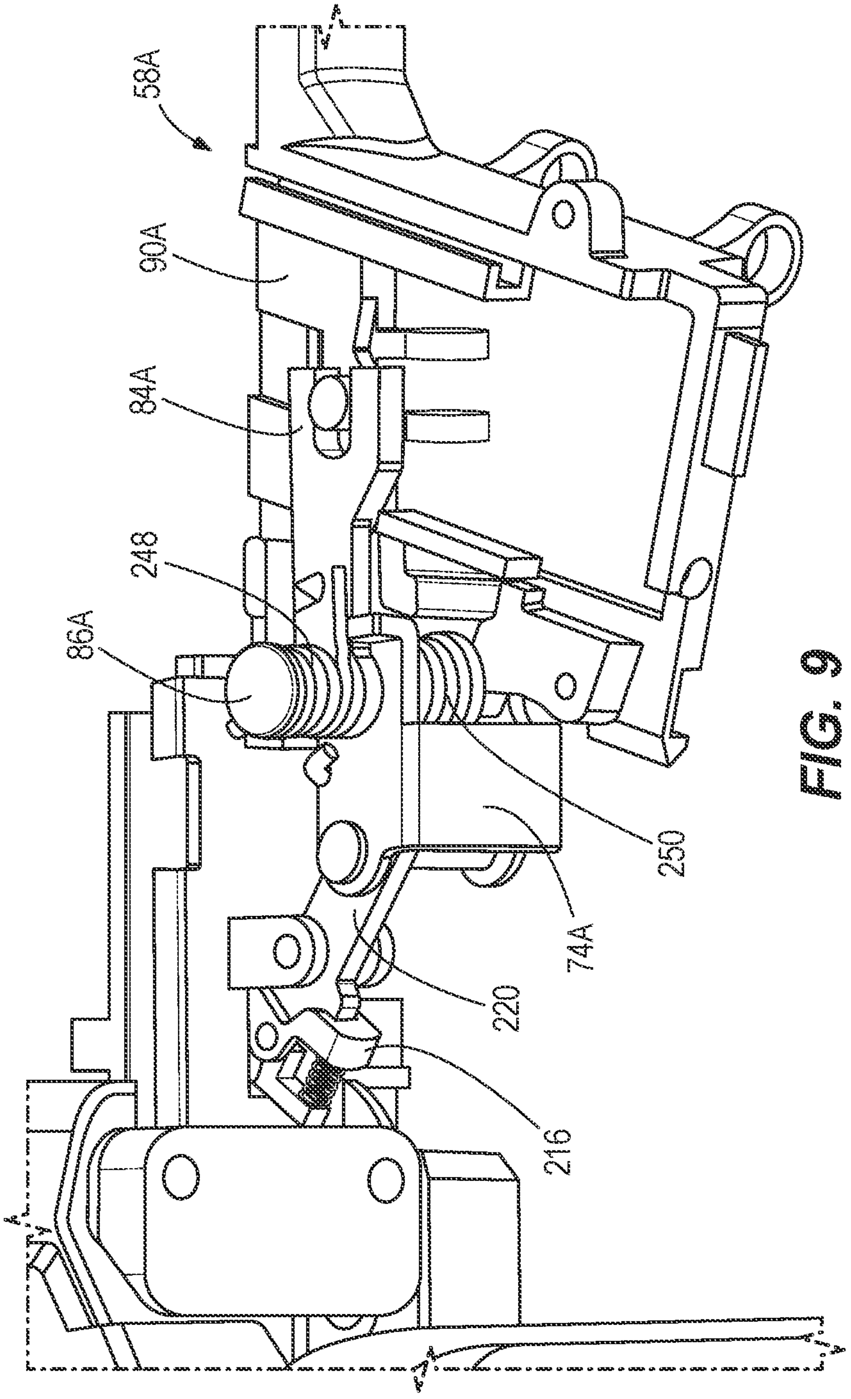
FIG. 9 is a perspective view of a fastener driver according to another embodiment of the invention, with portions removed, illustrating a pusher mechanism.

With reference to FIGS. 3 and 4, check pawls 105 are pivotably coupled to a shaft 106 carried on a nosepiece access door 103, which is pivotably coupled to the nosepiece 50. Each check pawl 105 includes a finger 107 that is in contact with the fasteners 48. Springs (FIG. 5B) bias the respective check pawls 105 toward the fasteners 48 to maintain the fingers 107 in contact with the fasteners 48 as the fasteners 48 are advanced toward the nosepiece 50. In operation, as the feeder arm 94 is retracted in the direction A1 (FIG. 6B), the fingers 107 of the respective check pawls 105 remain engaged with one of the collated fasteners 48 while the feeder arm 94 pivots around the same fastener 48. After clearing the fastener 48, the feeder arm 94 pivots toward an inboard position and behind the fastener 48 (FIG. 7B). As the feeder arm 94 moves the fastener 48 to the driver channel 54, the check pawls 105 are biased away from the fasteners 48 to allow the collated fasteners 48 to advance (FIG. 8B). The springs biasing the respective check pawls 105 then rebound, positioning the check pawls 105 between the next two fasteners 48 in the sequence, preventing backwards movement of the collated fasteners 48 toward the canister magazine 14 (FIG. 6B).

When a firing cycle is initiated (e.g., by a user pulling a trigger 44 of the fastener driver 10), the motor 46 is activated to rotate the lifting mechanism 42, which releases the driver blade 26, permitting the gas in the storage chamber cylinder 30 to expand and push the piston 22 downward into the cylinder 18. Prior to the piston 22 reaching the bottom dead center position in the cylinder 18, the driver blade 26 impacts the fastener 48 in the driver channel 54, discharging the fastener 48 from the nosepiece 50 and into the workpiece. During this time, the lifting mechanism 42 continues to rotate (i.e, by the motor 46 providing torque to the transmission output shaft 70), returning the piston 22 and driver blade 26 to the ready position in the cylinder 18. Simultaneously, the rotating transmission output shaft 70 and gear train 66 rotates the cam 62.

The cam 62 rotates nearly 360 degrees, causing the roller 78 to follow the cam 62 as the cam surface transitions from the valley 104 to a peak 108 (FIGS. 5A, 6A, and 7A), imparting pivoting movement to the lever 74 about the axis 76 in a direction opposite the arrow A0 (FIG. 2). As the lever 74 pivots, a fork 84 pushes a protruding pin 92 of the sliding body 90, converting the pivoting motion of the lever 74 to linear motion of the body 90 (FIG. 6A). As the body 90 slides away from the driver channel 54 in the direction of A1, the feeder arm 94 pivots to clear the next fastener in the sequence (FIGS. 6A and 6B). At this time, the check pawls 105 remain engaged with one of the fasteners 48, preventing the collated fasteners 48 from being driven rearward toward the canister magazine 14. When the body 90 is at a position farthest from the driver channel 54 (i.e., when the body 90 changes the direction of translation from A1 to A2), the springs biases the feeder arm 94 behind the next fastener 48 in the sequence (FIGS. 7A and 7B). Then, continued rotation of the cam 62 causes the roller 78 to transition from the peak 108 back to the valley 104, allowing a torsion spring 77 acting on the lever 74 to rebound, pivoting the lever 74 in the direction of arrow A0 and moving the fork 84 and, thus, the body 90 forward. Forward motion of the body 90 toward the driver channel 54 in the direction of A2 moves the feeder arm 94 forward (FIGS. 8A and 8B) and thus, pushes the collated fasteners 48 forward, and one of which into the driver channel 54A (FIGS. 5A and 5B). As such, pivoting movement of the lever 74 in the direction of arrow A0 and then a direction opposite arrow A0 as described above defines a complete reloading cycle of one of the collated fasteners 48 into the driver channel 54.

FIGS. 9-11B illustrate another embodiment of a pusher mechanism 58A for use with a gas spring-powered fastener driver, like that described above and shown in FIGS. 1-8. Accordingly, features and elements of the fastener driver and pusher mechanism 58A corresponding with like features and elements of the fastener driver 10 and pusher mechanism 58 are given like reference numbers followed by the letter 'A.'

Like the driver 10, the driver in which the pusher mechanism 58A is used includes a lifting mechanism (not shown) that returns a piston (not shown) and a driver blade 26A from the BDC position toward the ready position by energizing a motor (not shown). The pusher mechanism 58A differs from the pusher mechanism 58 in that the pusher mechanism 58A is actuated by the impact of the driver blade 26A during the retraction stroke of the driver blade 26A from the BDC position toward the ready position.

Figure 10A:
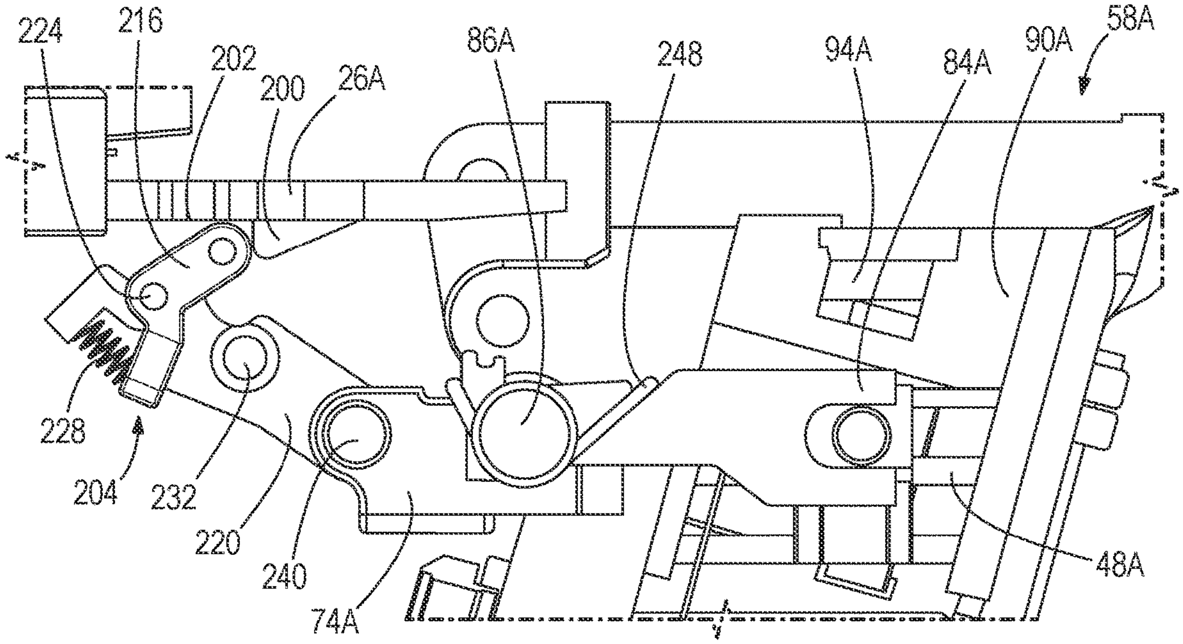
FIG. 10A is a plan view of the pusher mechanism of FIG. 9, illustrating the pusher mechanism just prior to engagement with a driver blade.
Figure 10B:
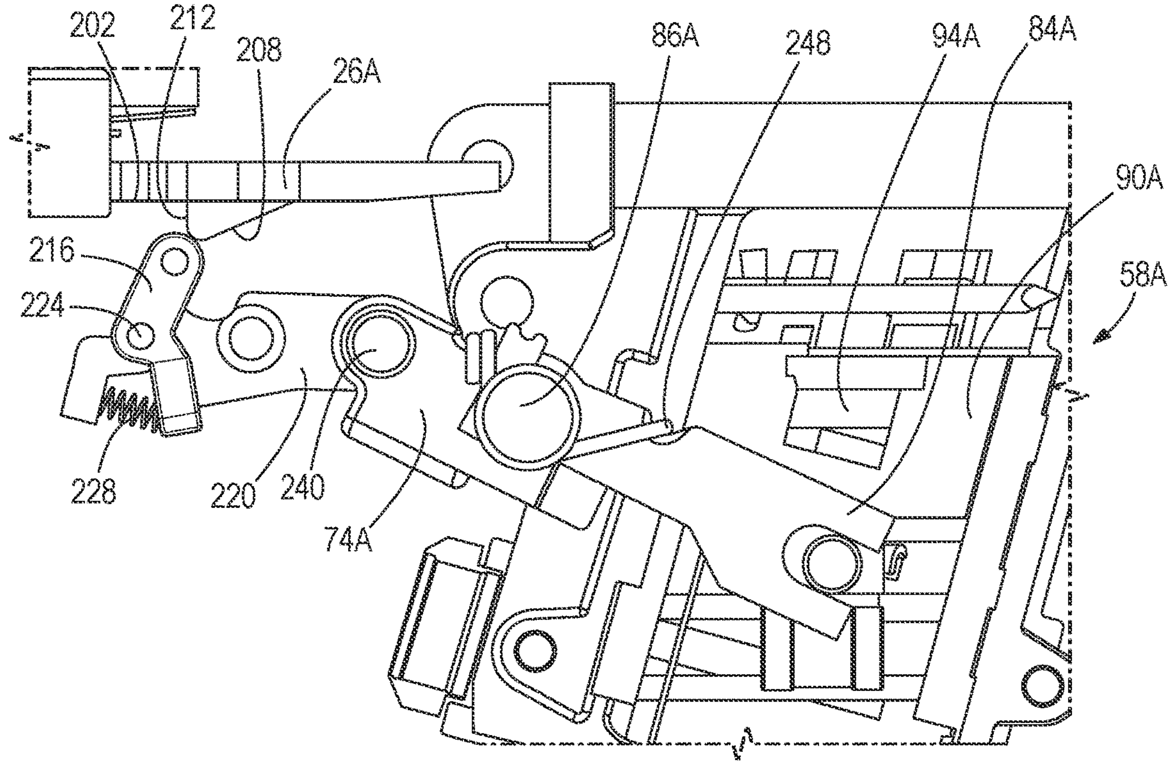
FIG. 10B is a plan view of the pusher mechanism of FIG. 9, illustrating the pusher mechanism being actuated by engagement with the driver blade.

With reference to FIGS. 10A and 10B, the driver blade 26A includes a fin 200 on a rear surface 202 thereof configured to pivot a linkage assembly 204 of the pusher mechanism 58A, imparting reciprocating translation of the body 90A and the attached feeder arm 94A to load fasteners 48 into the driver channel 54A. The fin 200 includes a first surface 208 that is inclined relative to the rear surface 202 at an oblique angle and a second surface 212 that is perpendicular to the rear surface 202 of the driver blade 26A. The linkage assembly 204 includes a finger 216 pivotably coupled to a support arm 220 about a first pivot

224. A spring 228 biases the finger 216 in a counter-clockwise direction (from the frame of reference of FIG. 10A), such that a distal end of the finger 216 is selectively engageable with the first and second surfaces 208, 212 of the fin 200 on the driver blade 26A. The support arm 220 is pivotably coupled to a fixed portion of the driver 10A via a first fixed pivot 232. The support arm 220 is pivotably coupled to the lever 74A via a floating pivot 240, and the lever 74A is pivotably coupled to the fork 84A via a second fixed pivot 86A. The remainder of the pusher mechanism 58A (e.g., the body 90A and attached feeder arm 94A) are the same as the body 90 and feeder arm 94 of the pusher mechanism 58.

When a firing cycle is initiated, the driver blade 26A moves from the TDC position to the driven or BDC position. As the driver blade 26A moves toward the BDC position, the distal end of the finger 216 slides along the inclined first surface 208 of the fin 200, pivoting the finger 216 in a clockwise direction from the frame of reference of FIG. 11A, compressing the spring 228. After the distal end of the finger 216 slides over the second surface 212, the spring 228 rebounds, pivoting the finger 216 in a counter-clockwise direction back to the position shown in FIG. 10A, where the distal end of the finger 216 is spaced from the rear surface 202 of the driver blade 26A, but may be engaged by the second surface 212 during a retraction stroke of the driver blade 26A. At this time, the remainder of the linkage assembly, including the support arm 220, lever 74A, and the fork 84A, remain stationary. Thus, the position of the body 90A and the attached feeder arm 94A (as shown in FIG. 10A) remains unchanged.

However, as the driver blade 26A retracts from the BDC position toward the ready position, the distal end of the finger 216 contacts the second surface 212 of the fin 200 (as shown in FIG. 10A). Because the finger 216 cannot pivot further in a counter-clockwise direction from that shown in FIG. 10A, continued retraction of the driver blade 26A imparts a moment to the support arm 220 about pivot 232, thereby pivoting the support arm 220 in a counter-clockwise direction. Because the floating pivot 240 is secured to the end of the support arm 220, a moment is also imparted to the lever 74A and the fork 84A, causing both to pivot about the pivot 86A (in a clockwise direction from the frame of reference of FIG. 10A) and translate the body 90A and the attached feeder arm 94A rearward to the position shown in FIG. 10B where the feeder arm 94A is positioned behind a new fastener 48A in the collated strip.

Figure 11A:
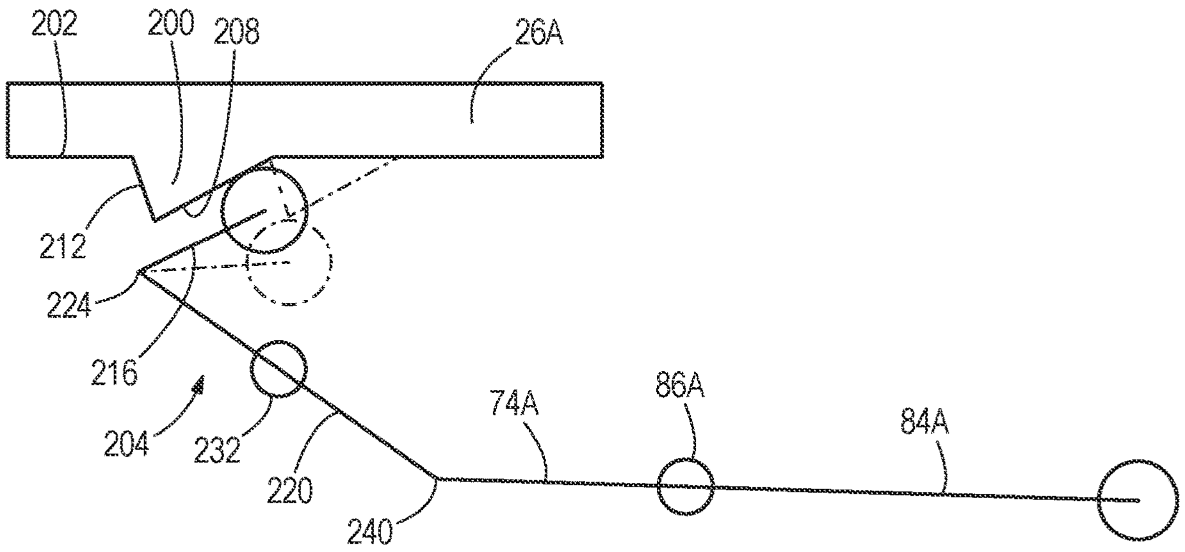
FIG. 11A is a schematic view of the pusher mechanism of FIG. 10A.
Figure 11B:
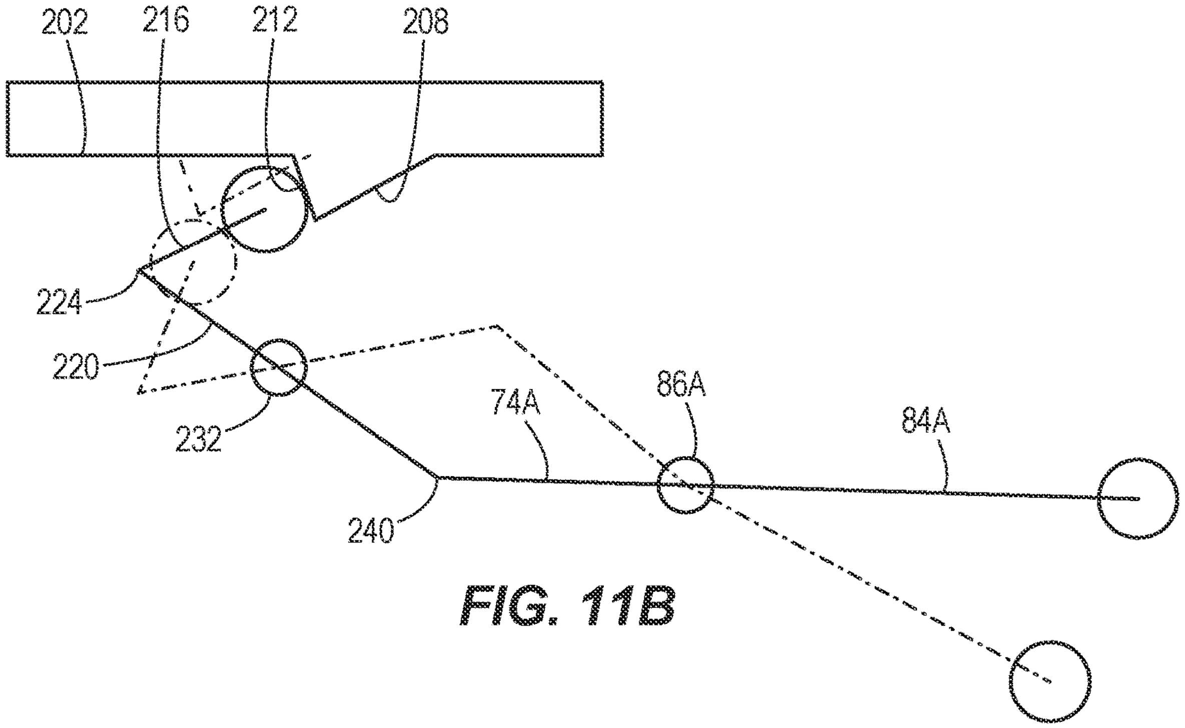
FIG. 11B is a schematic view of the pusher mechanism of FIG. 10B.

As the driver blade 26A continues to retract to the ready position, continued pivoting of the fork 84A is inhibited while the lever 74A continues to move (shown schematically in FIG. 11B). The continued motion of the lever 74A winds a torsion spring 248 (FIG. 9) disposed between the lever 74A and the fork 84A. As the finger 216 passes around the transition between the second surface 212 and the first surface 208 of the fin 200, counter-clockwise rotation of the linkage assembly (from the frame of reference of FIG. 11A) stops, and a torsion spring 250 (FIG. 9) acting on the lever 74A begins to rebound, imparting a moment on the lever 74A in a counter-clockwise direction (from the frame of reference of FIG. 11B). The torsion spring 248 also rebounds, returning the lever 74A and the fork 84A into alignment with each other as shown in FIG. 11A. Continued rotation of the lever 74A in the counter-clockwise direction rotates the floating pivot 240 downward, pivoting the support arm 220 about the first fixed pivot 232 in a clockwise direction, thus maintaining the distal end of the finger 216 engaged with the inclined surface 208 of the fin 200 as the driver blade 26A approaches the ready position. Also, during this time, the fork 84A is pivoted about the second fixed pivot 86A in a counter-clockwise direction, translating the body 90*a* and the attached feeder arm 94A forward and toward the driver channel 54A such that the feeder arm 94A pushes another fastener 48A into the driver channel 54A.

Figure 12:
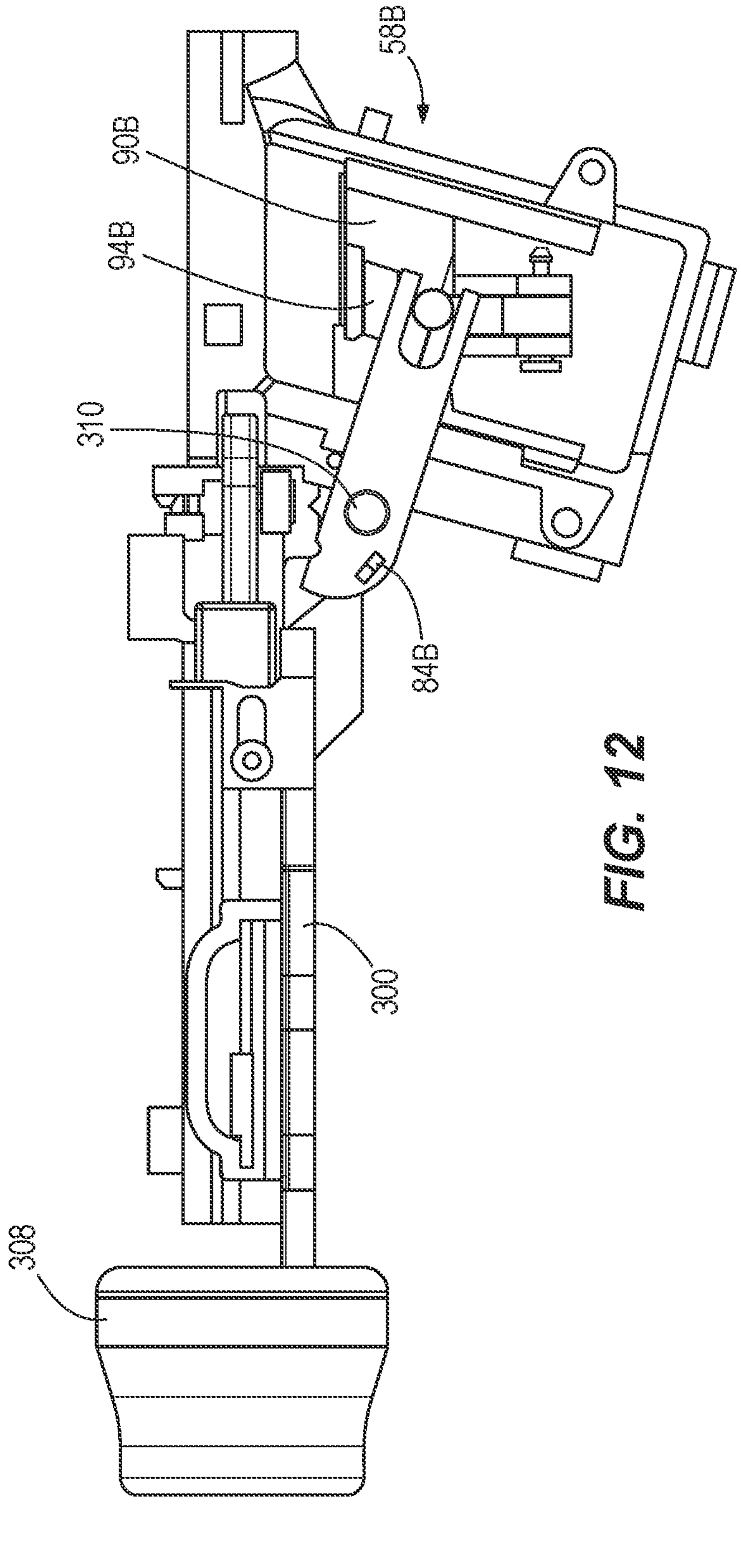
FIG. 12 is a plan view of a fastener driver according to another embodiment of the invention, with portions removed, illustrating a pusher mechanism.

FIG. 12 illustrates another embodiment of a pusher mechanism 58B for use with a gas spring-powered fastener driver, like that described above and shown in FIGS. 1-8. Accordingly, features and elements of the fastener driver and pusher mechanism 58B corresponding with like features and elements of the fastener driver 10 and pusher mechanism 58 are given like reference numbers followed by the letter 'B.'

The pusher mechanism 58B differs from the pusher mechanism 58 in that the pusher mechanism 58B is actuated using the energy of the gas spring during a fastener driving operation. The pusher mechanism 58B includes a link or push arm 300 extending between a bumper 308, which is positioned within the cylinder 18B, and a fork 84B, which is pivotably coupled to the nosepiece 50B. The pusher mechanism 58B also includes a body 90B and an attached feeder arm 94B, which are like the body 90 and feeder arm 94 described above and shown in FIGS. 1-7D. The push arm 300 is coupled for movement with the bumper 308, which is supported within the cylinder 18B by a bumper spring (not shown). The spring (e.g., a compression spring) biases the bumper 308 and the attached push arm 300 to the left from the frame of reference of FIG. 12, away from the nosepiece 50B. Although not shown, the pusher mechanism 58B also includes a torsion spring, like the torsion spring 250 in FIG. 9, for biasing the fork 84B in a counterclockwise direction from the frame of reference of FIG. 12.

During a fastener driving operation, the movable piston 22B to which the driver blade 26B is attached impacts the bumper 308 as the driver blade 26B approaches the BDC position. The impact compresses the bumper spring and moves the bumper 308 toward the nosepiece 50B. The push arm 300 moves with the bumper 308, causing a cam portion of the push arm 300 to slide along a follower portion of the fork 84B, imparting a moment to the fork 84B causing it to rotate in a clockwise direction about a stationary pivot 310 coupling the fork 84B to the nosepiece 50B. The movement imparted on the fork 84B displaces the block 90B and the attached feeder arm 94B rearward, allowing the feeder arm 94B to pick up the next fastener 48B in the collated strip.

After the movable piston 22B and the driver blade 26B begin retraction toward the ready position, the bumper spring rebounds, pushing the bumper 308 and the push arm 300 away from the nosepiece 50B. This permits the torsion spring acting on the fork 84B to rebound, pivoting the fork 84B in a counterclockwise direction from the frame of reference of FIG. 12 and displacing the block 90B and attached feeder arm 94B forward, positioning another fastener 48B in the driver channel 54B.

Figure 13A:
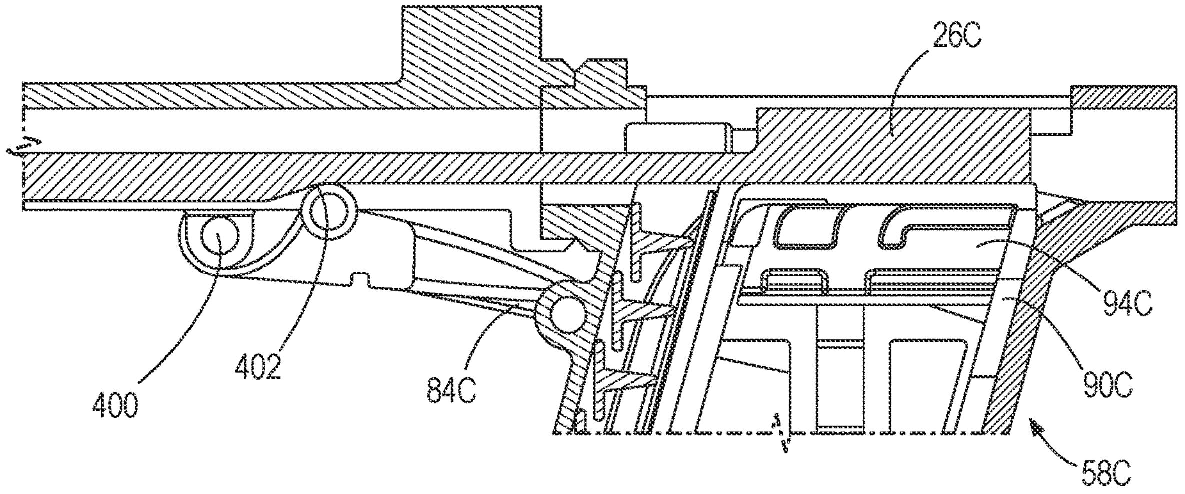
FIG. 13A is a plan view of a fastener driver according to another embodiment of the invention, with portions removed, illustrating a pusher mechanism just prior to engagement with a driver blade.
Figure 13B:
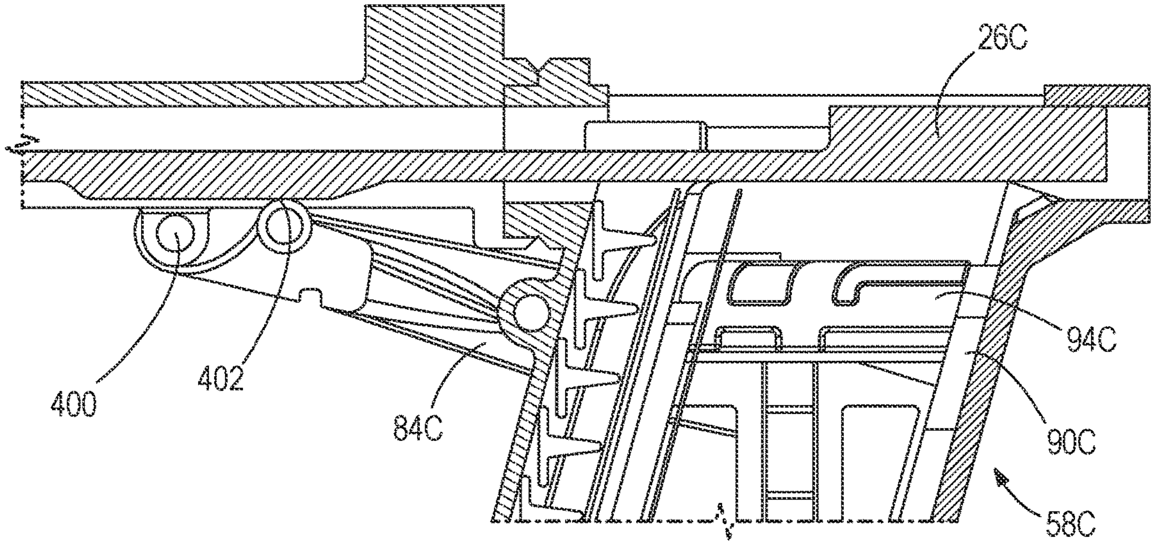
FIG. 13B is a plan view of the pusher mechanism of FIG. 13A, illustrating the pusher mechanism being actuated by engagement with the driver blade.
Figure 14:
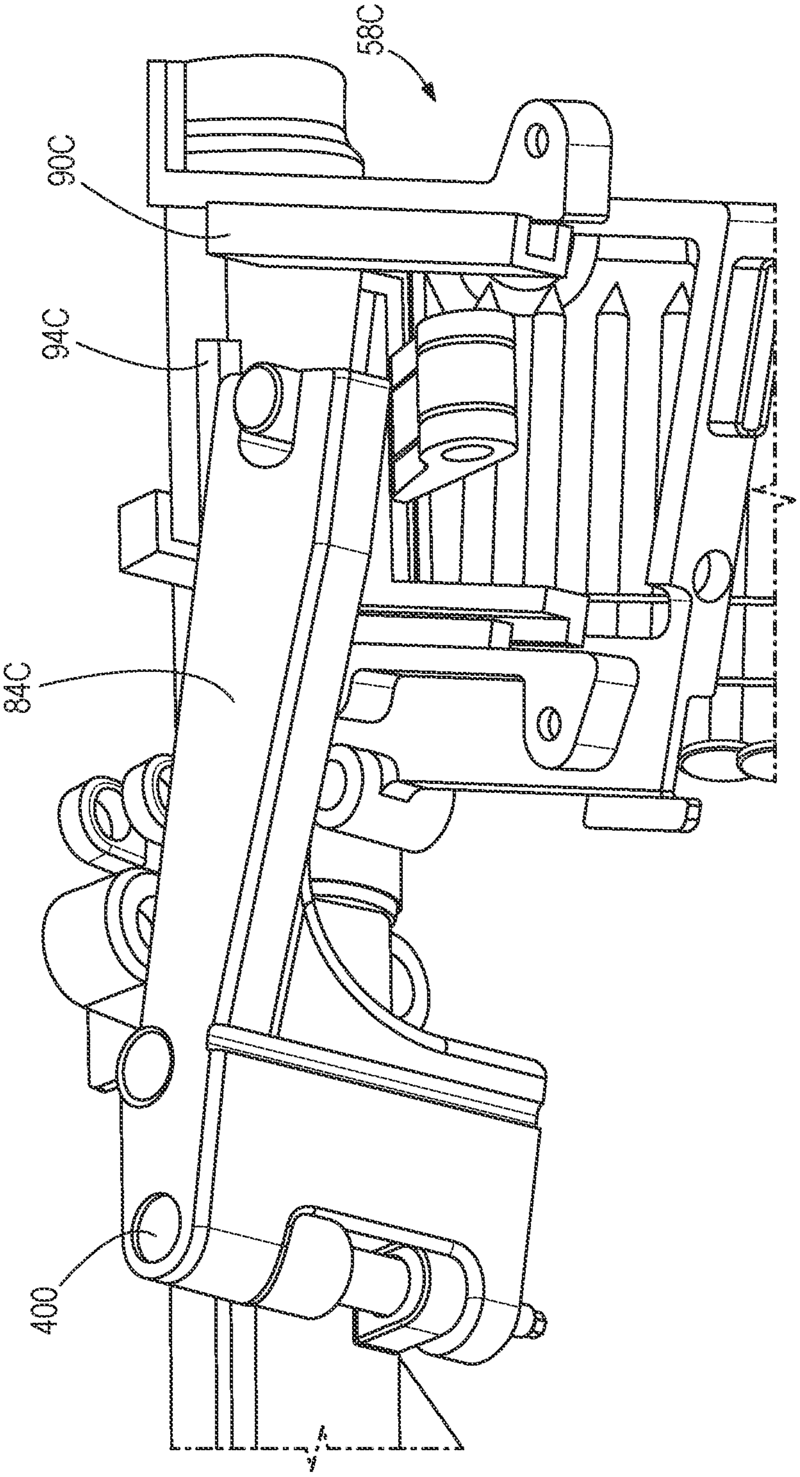
FIG. 14 is a perspective view of the pusher mechanism of FIG. 13A.

FIGS. 13A-14 illustrate another embodiment of a pusher mechanism 58C for use with a gas spring-powered fastener driver, like that described above and shown in FIGS. 1-8. Accordingly, features and elements of the fastener driver and pusher mechanism 58C corresponding with like features and elements of the fastener driver 10 and pusher mechanism 58 are given like reference numbers followed by the letter 'C.'

The pusher mechanism 58C differs from the pusher mechanism 58 in that the pusher mechanism 58C is actuated using energy of the gas spring during a fastener driving operation. The pusher mechanism 58C includes a fork 84C (a pivot arm) pivotably coupled to the nosepiece 50C via a stationary pivot 400. The pusher mechanism 58C also includes a body 90C and an attached feeder arm 94C, which are like the body 90 and feeder arm 94 described above and shown in FIGS. 1-8. As shown in FIGS. 13A and 13B, the fork 84C includes a follower portion that is engageable with a cam portion 402 on the driver blade 26C during movement of the driver blade 26C toward the BDC position. Although not shown, the pusher mechanism 58C further includes a spring (e.g., a torsion spring) for biasing the fork 84C in a clockwise direction from the frame of reference of FIGS. 13A and 13B (i.e., toward the nosepiece 50C).

During a fastener driving operation, the cam portion 402 of the driver blade 26C impacts the follower portion of the fork 84C as the driver blade 26C approaches the BDC position. This impact imparts a moment to the fork 84C, causing it to rotate in a clockwise direction about the stationary pivot 400 from the frame of reference of FIG. 13A. The movement imparted on the fork 84C displaces the block 90C and the attached feeder arm 94C rearward (FIG. 13B), allowing the feeder arm 94B to pick up the next fastener 48B in the collated strip.

After the movable piston 22C and the driver blade 26C begin retraction toward the ready position, the spring acting on the fork 84C rebounds, pivoting the fork 84C in a counterclockwise direction from the frame of reference of FIG. 13B and displacing the block 90C and attached feeder arm 94C forward (FIG. 13A), positioning another fastener 48C in the driver channel 54C.

Figure 15:
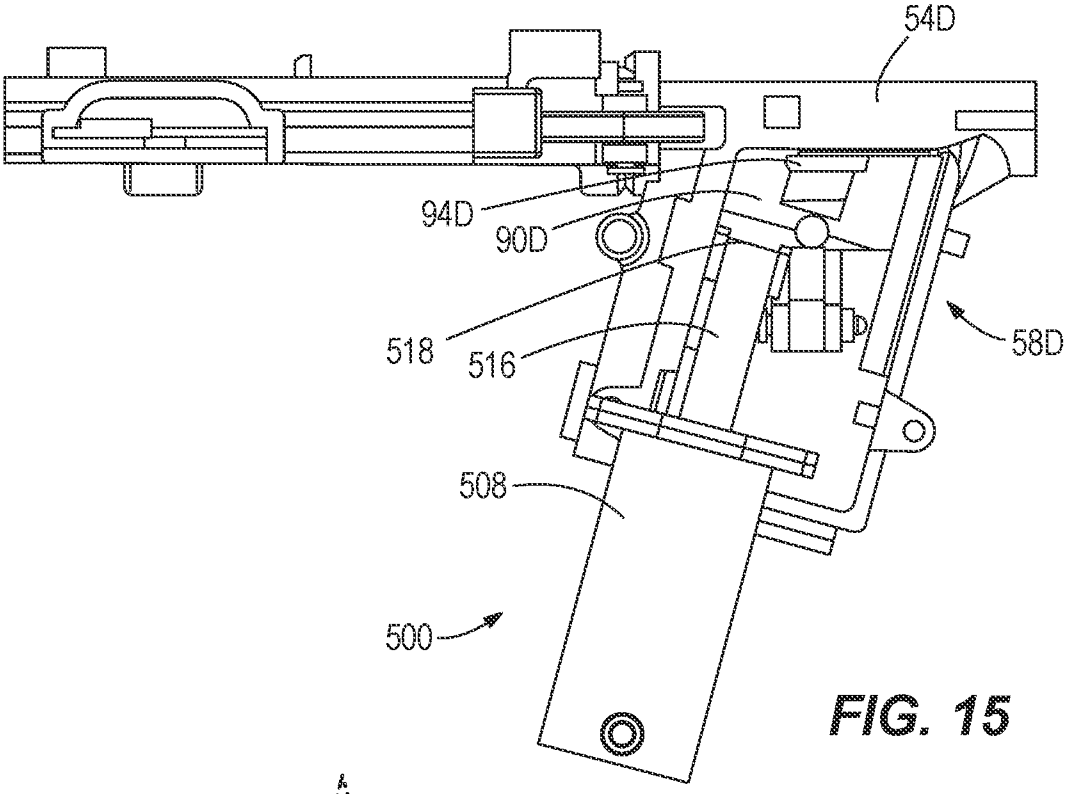
FIG. 15 is a plan view of a fastener driver according to another embodiment of the invention, with portions removed, illustrating a pusher mechanism.
Figure 16:
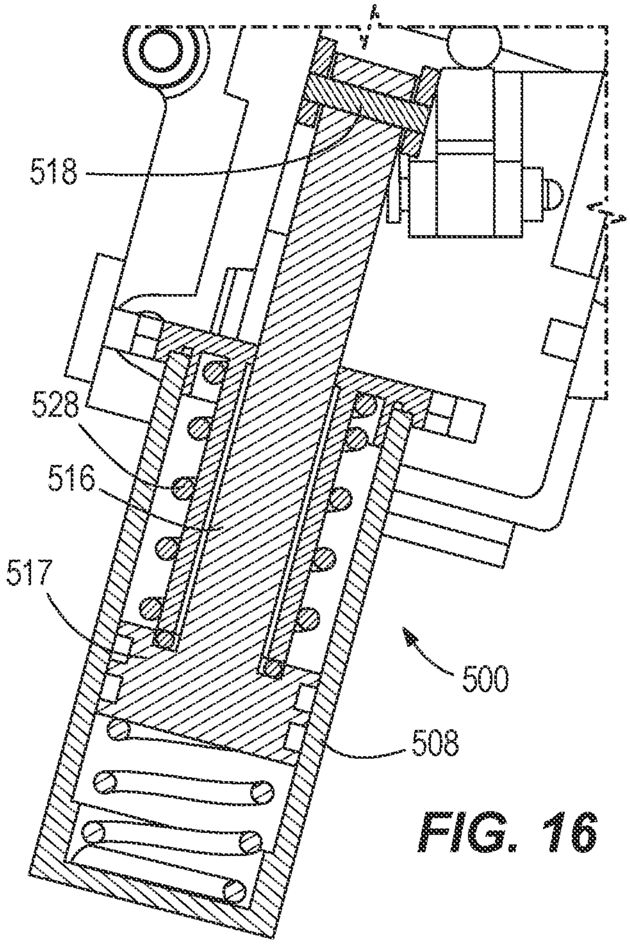
FIG. 16 is an enlarged, partial cross-sectional view of the pusher mechanism of FIG. 15.

FIGS. 15 and 16 illustrate another embodiment of a pusher mechanism 58D for use with a gas spring-powered fastener driver, like that described above and shown in FIGS. 1-8. Accordingly, features and elements of the fastener driver and pusher mechanism 58D corresponding with like features and elements of the fastener driver 10 and pusher mechanism 58D are given like reference numbers followed by the letter 'D.'

Like the driver 10, the driver in which the pusher mechanism 58D is used includes a lifting mechanism (not shown) that returns a piston (not shown) and a driver blade 26D from the BDC position toward the ready position by energizing a motor (not shown). The pusher mechanism 58D differs from the pusher mechanism 58 in that the pusher mechanism 58D is actuated using the energy of the gas spring during a fastener driving operation. The pusher mechanism 58D includes a pneumatic cylinder 500 coupled to a mount portion of the canister magazine 14D or another portion of the fastener driver. As shown in FIGS. 15 and 16, the cylinder 500 includes an outer housing 508 and a plunger 516 extending from the outer housing 508. The plunger 516 includes a piston 517 at one end and a mount 518 at an opposite end to which the body 90D is coupled. The cylinder 500 also includes a spring (e.g., compression spring 528) biasing the plunger 516 toward a retracted position within the outer housing 508 and an inlet/outlet port (not shown) in the rear of the outer housing 508 (i.e., an opposite end from which the plunger 516 protrudes) in fluid communication with the storage chamber cylinder 30 (via an internal or external hose or passageway).

A feeder arm 94D is pivotably coupled to the plunger 516 via sliding body 90D. Because the feeder arm 94D is supported by the plunger 516, the feeder arm 94D reciprocates with the sliding body 90D in response to reciprocating movement of the plunger 516. In alternative embodiments, the feeder arm 94D may be directly connected to the plunger mount 618.

In operation, when the driver blade 26D is in the ready position prior to a fastener driving operation, pressurized gas in the storage chamber cylinder 30 (via the inlet/outlet port) fills the outer housing 508 and applies a force against the plunger piston 517 sufficient to maintain the plunger 516 in an extended position shown in FIG. 15. After the driver blade 26D moves to the BDC position and impacts the fastener 48D, the pressure within the storage chamber cylinder 30D drops rapidly, also reducing the pressure of the compressed gas acting on the plunger piston 517. This allows the spring 528 to rebound, retracting the plunger 516 into the outer housing 508 and sliding the feeder arm 94D away from the driver channel 54D, allowing the feeder arm 94D to pivot behind the next fastener 48D in the collated strip. As the driver blade 26D is returned from the BDC position toward the ready position, the pressure within the storage chamber cylinder 30D increases. This pressure increase is communicated to the outer housing 508 via the inlet/outlet port. When the applied force on the plunger piston 517 becomes greater than the biasing force of the spring 528, the plunger 516 is extended from the outer housing 508, which moves the attached sliding body 90D and feeder arm 94D toward the driver channel 54D to reload another fastener into the driver channel 54D.

Figure 17:
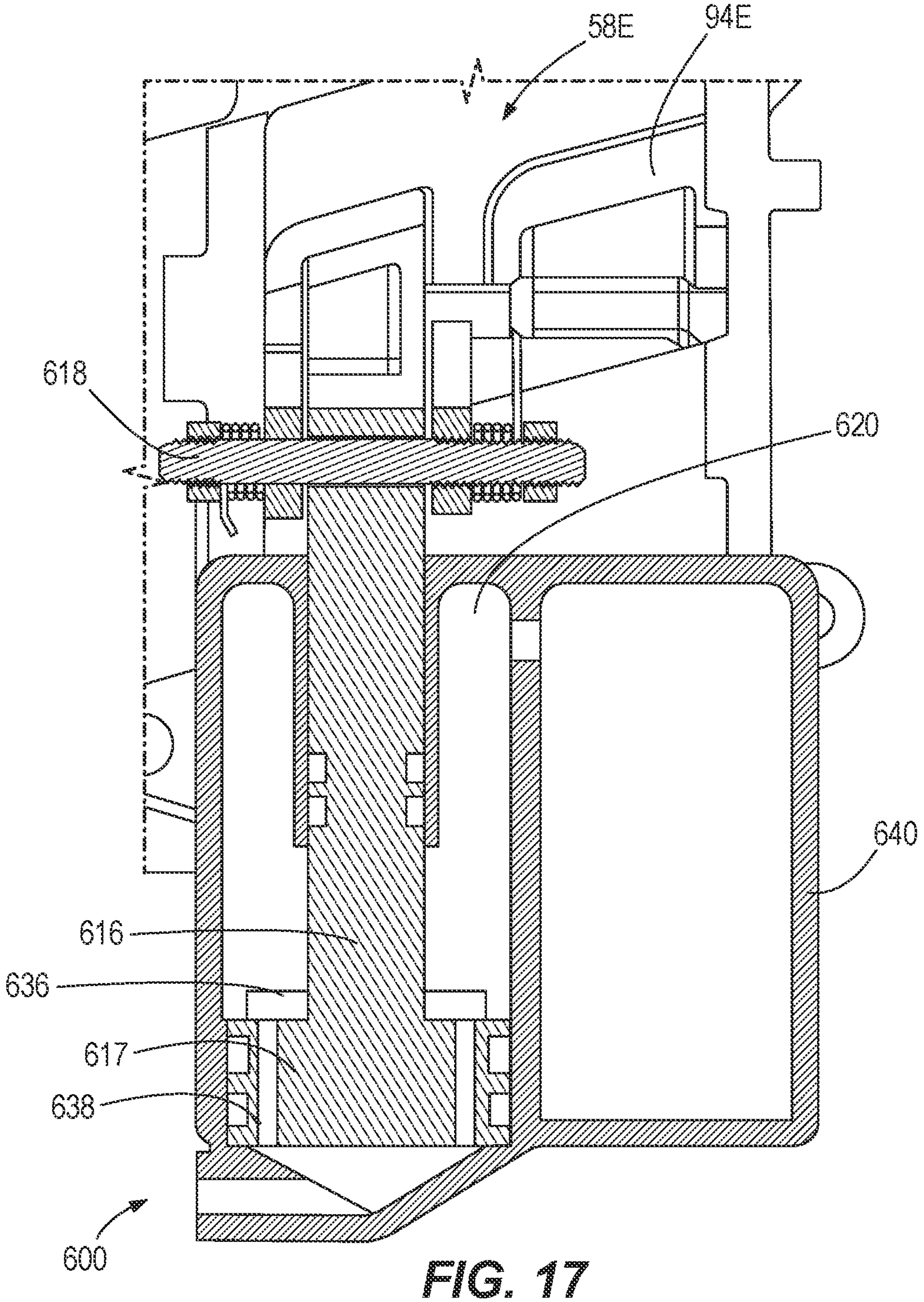
FIG. 17 is an enlarged, partial cross-sectional view of another embodiment of a pusher mechanism for use with the fastener driver of FIG. 15.
Figure 18A:
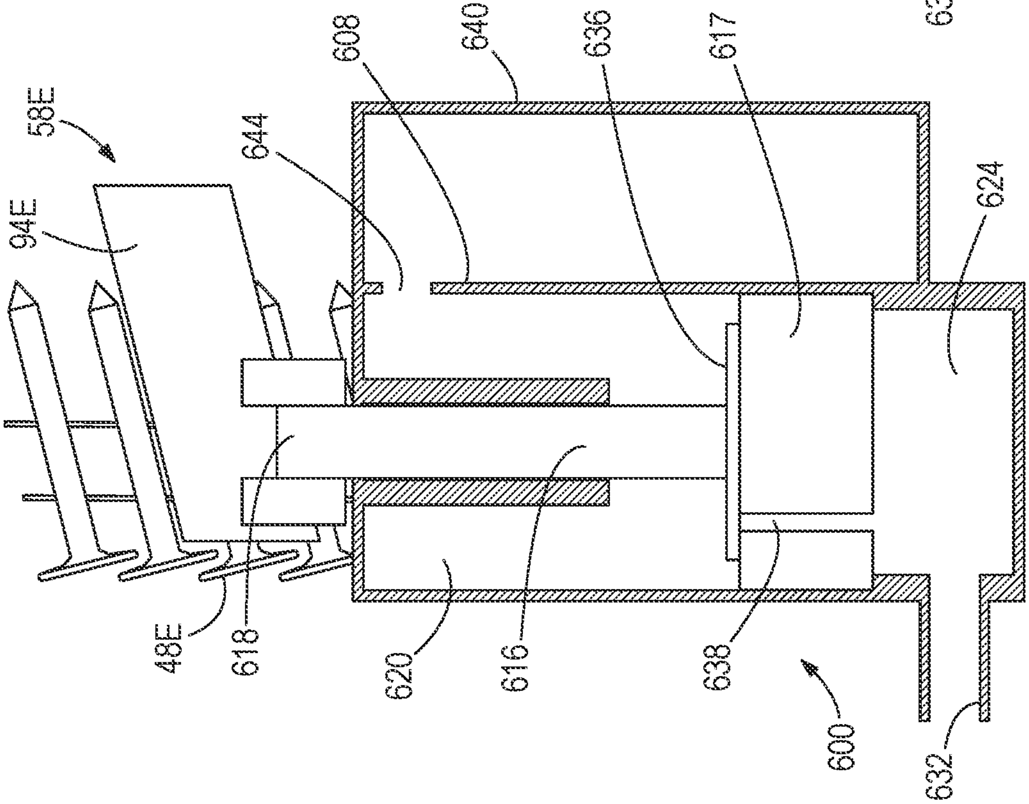
FIG. 18A is a schematic view of another embodiment of a pusher mechanism for use with the fastener driver of FIG. 15, illustrating the pusher mechanism in a first position.
Figure 18B:
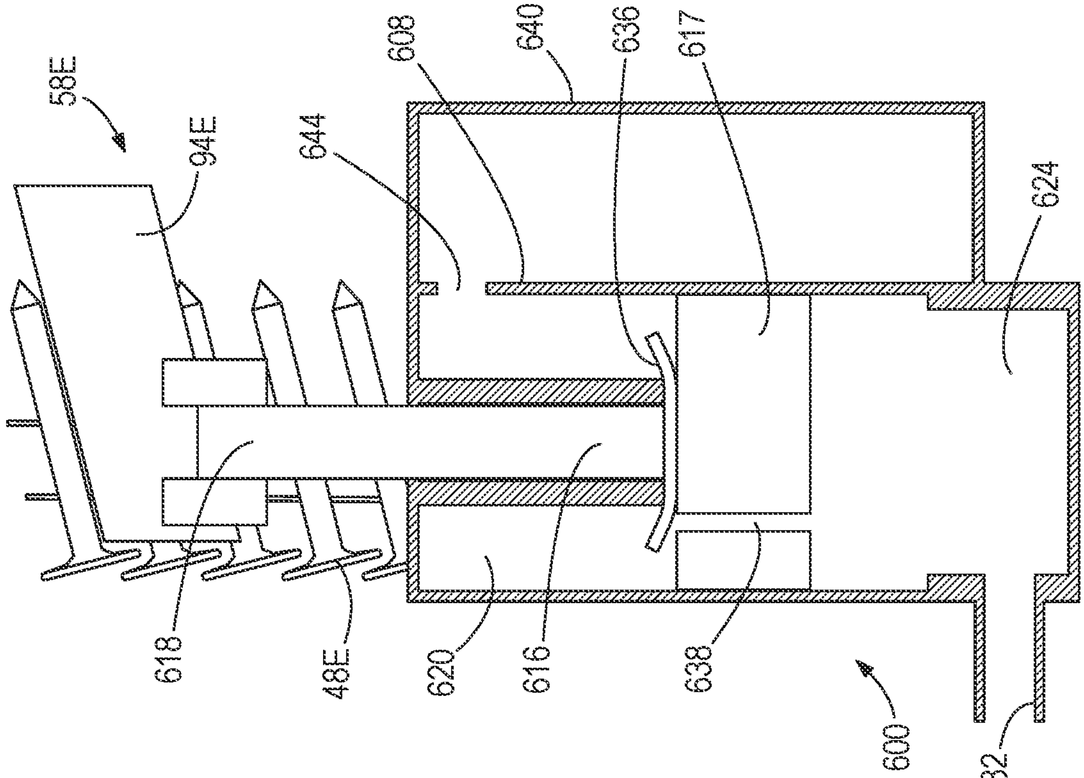
FIG. 18B is a schematic view of the pusher mechanism of FIG. 19A in a second position.

FIGS. 17-18B illustrate another embodiment of a pusher mechanism 58E for use with a gas spring-powered fastener driver, like that described above and shown in FIGS. 1-8. Accordingly, features and elements of the fastener driver and pusher mechanism 58E corresponding with like features and elements of the fastener driver 10 and pusher mechanism 58 are given like reference numbers followed by the letter 'E.'

Like the driver 10, the driver in which the pusher mechanism 58E is used includes a lifting mechanism (not shown) that returns a piston (not shown) and a driver blade 26E from the BDC position toward the ready position by energizing a motor (not shown). The pusher mechanism 58E differs from the pusher mechanism 58 in that the pusher mechanism 58E is actuated using the energy of the gas spring during a fastener driving operation. The pusher mechanism 58E includes a pneumatic cylinder 600 coupled to a mount portion of the canister magazine 14E or another portion of the fastener driver. As shown in FIG. 17, the cylinder 600 includes an outer housing 608 and a plunger 616 extending from the outer housing 608. The plunger 616 includes a piston 617 at one end and a mount 618 at an opposite end to which the feeder arm 94E is pivotably coupled, and is movable between an extended position (FIG. 18B) and a retracted position (FIG. 18A). The plunger piston 617 separates the outer housing 608 into a first side 620 and a second side 624. The plunger 616 includes a check valve 636 that selectively fluidly connects the first side 620 with the second side 624 via an axial passageway 638 through the plunger piston 617. A reservoir 640 is adjacent the pneumatic cylinder 600 and is fluidly connected to the first side 620 via an inlet/outlet port 644. The cylinder 600 also includes an inlet/outlet port 632 in the rear of the outer housing 608 (i.e., an opposite end from which the plunger 616 protrudes) in fluid communication with the storage chamber cylinder 30 (via an internal or external hose or passageway).

The feeder arm 94E is directly connected to the plunger 616 and as such, reciprocates with the plunger 616 in response to reciprocating movement of the plunger 616 between the extended and retracted positions. In alternate embodiments, the feeder arm 94E may be indirectly connected, or coupled, to the plunger 616 via a sliding body like body 90.

In operation, when the driver blade 26E is in the ready position, the pressure in the first side 620 and the second side 624 of the outer housing 608, and the reservoir 640, is equalized with the plunger 616 maintained in the extended position (FIG. 18B). The check valve 636, at this time, assumes a non-deflected state as shown in FIG. 18A because the pressure of compressed gas in the first side 620 is equal to the second side 624. After the driver blade 26E moves to the BDC position and impacts the fastener 48E, the pressure within the storage chamber cylinder 30E drops rapidly, also reducing the pressure of compressed gas in the second side 624. With the pressure in the first side 620 remaining unchanged because the passageway is kept closed by the check valve 636, a force imbalance is created on the plunger piston 617, causing the plunger 616 to retract into the outer housing 608 and sliding the feeder arm 94E away from the driver channel 54E. This allows the feeder arm 94E to pivot behind the next fastener 48E in the collated strip.

As the driver blade 26E is returned from the BDC position toward the ready position, the pressure within the storage chamber cylinder 30E increases. This pressure increase is communicated to the outer housing 608 via the inlet/outlet port 632. When the pressure of compressed gas in the second side 624 exceeds the pressure of compressed gas in the first side 620 and reservoir 640, the check valve 636 opens, permitting transfer of compressed gas from the second side 624 to the first side 620 via the passageway 638 and creating a force imbalance on the plunger piston 617. When the applied force on the plunger piston 617 (from the compressed gas in the second side 624, which has a larger exposed area than the first side 620) becomes greater than the applied force on the opposite side of the plunger piston 617 (from the compressed gas in the first side 620, which has a smaller exposed area), the plunger 616 is extended from the outer housing 608. This moves the attached feeder arm 94E toward the driver channel 54E to reload another fastener into the driver channel 54E (FIG. 18B).

Figures 19A, 19B:
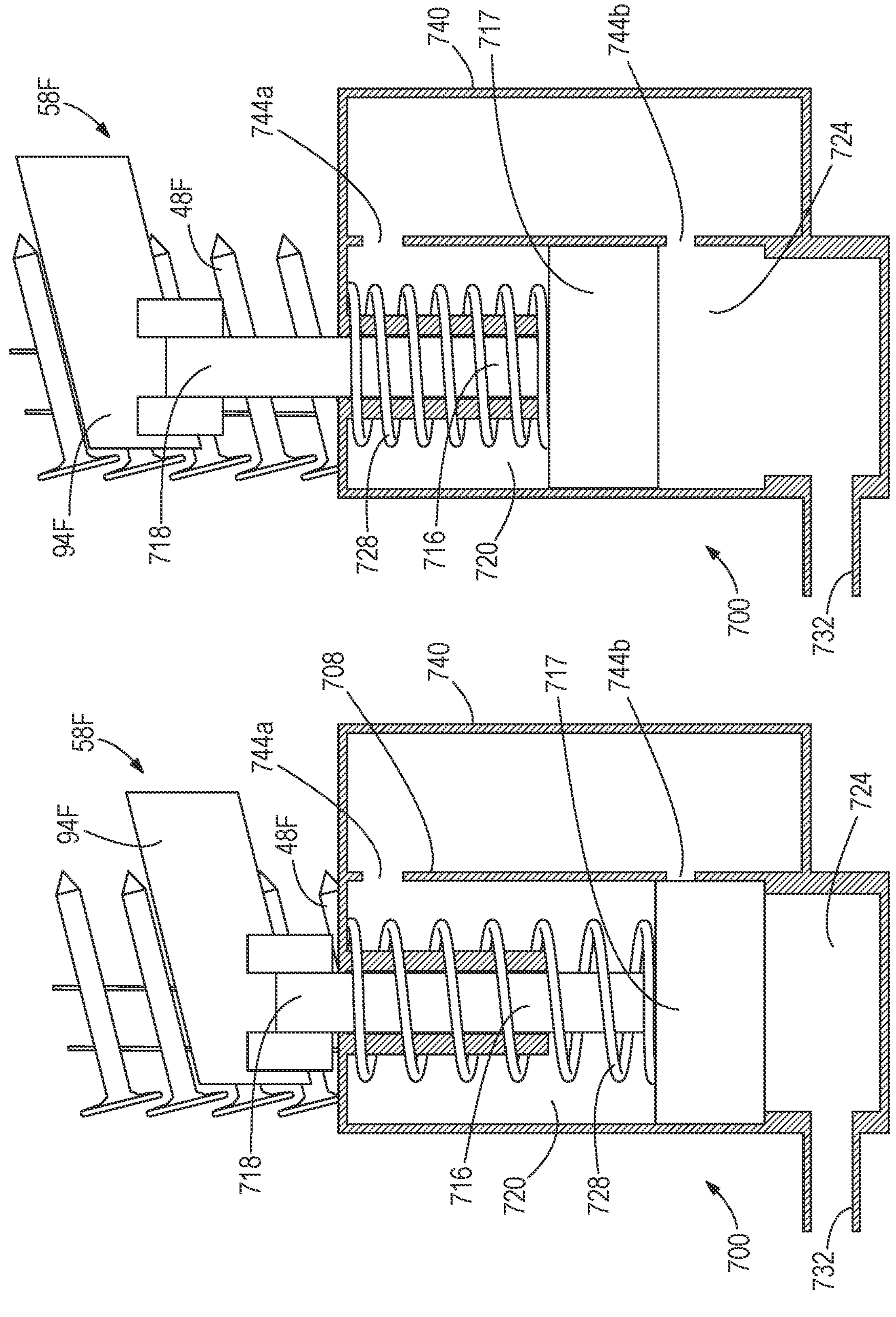
FIG. 19A is a schematic view of the pusher mechanism of FIG. 17 in a first position.
FIG. 19B is a schematic view of the pusher mechanism of FIG. 17 in a second position.

FIGS. 19A and 19B illustrate another embodiment of a pusher mechanism 58D for use with a gas spring-powered fastener driver, like that described above and shown in FIGS. 1-8. Accordingly, features and elements of the fastener driver and pusher mechanism 58D corresponding with like features and elements of the fastener driver 10 and pusher mechanism 58D are given like reference numbers followed by the letter 'F.'

Like the driver 10, the driver in which the pusher mechanism 58F is used includes a lifting mechanism (not shown) that returns a piston (not shown) and a driver blade 26F from the BDC position toward the ready position by energizing a motor (not shown). The pusher mechanism 58F differs from the pusher mechanism 58 in that the pusher mechanism 58F is actuated using the energy of the gas spring during a fastener driving operation. The pusher mechanism 58F includes a pneumatic cylinder 700 coupled to a mount portion of the canister magazine 14F or another portion of the fastener driver. The cylinder 700 includes an outer housing 708 and a plunger 716 extending from the outer housing 708. The plunger 716 includes a piston 717 at one end and a mount 718 at an opposite end to which the feeder arm 94F is pivotably coupled, and is movable between an extended position (FIG. 18B) and a retracted position (FIG. 18A). The plunger piston 716 separates the outer housing 708 into a first side 720 and a second side 724. The first side 720 includes plunger spring 728 disposed around the plunger 716 to bias the plunger 716 toward the second side 724. A reservoir 740 is adjacent the pneumatic cylinder 700 and is fluidly connected to the first side 720 via inlet/outlet ports 744*a*, 744*b*. The cylinder 700 also includes an inlet/outlet port 732 in the rear of the outer housing 708 (i.e., an opposite end from which the plunger 716 protrudes) in fluid communication with the storage chamber cylinder 30 (via an internal or external hose or passageway).

The feeder arm 94E is directly connected to the plunger 716 and as such, reciprocates with the plunger 716 in response to reciprocating movement of the plunger 716 between the extended and retracted positions. In alternate embodiments, the feeder arm 94F may be indirectly connected, or coupled, to the plunger 716 via a sliding body like body 90.

In operation, when the driver blade 26F is in the ready position, the pressure in the first side 720 and the second side 724 of the outer housing 708, and the reservoir 740, is equalized (via the inlet/outlet ports 744*a*, 744*b*). Because the exposed surface area of the plunger piston 717 on the second side 724 is greater than that on the first side 720, a net force is applied to the plunger piston 717 at the second side 724 that is greater than the force applied by the spring 728, thereby maintaining the plunger 716 in the extended position (FIG. 19B). After the driver blade 26F moves to the BDC position and impacts the fastener 48F, the pressure within the storage chamber cylinder 30F drops rapidly, also reducing the pressure of compressed gas in the second side 724. This reduces the applied force on the plunger piston 717 at the second side 724, permitting the spring 728 to quickly rebound and partially retract the plunger 716 to close the inlet/outlet port 744*b*. With the inlet/outlet port 744*b* closed and the pressure in the first side 720 remaining mostly unchanged, a force imbalance is created on the plunger piston 717, causing the spring 728 and the compressed gas in the reservoir 740 to urge the plunger piston 717 toward the second side 724 and sliding the feeder arm 94F away from the driver channel 54F (FIG. 19A). This allows the feeder arm 94F to pivot behind the next fastener 48F in the collated strip.

As the driver blade 26F is returned from the BDC position toward the ready position, the pressure within the storage chamber cylinder 30F increases. This pressure increase is communicated to the outer housing 708 via the inlet/outlet port 732. When the applied force on the plunger piston 717 (from the compressed gas in the second side 724, which has a larger exposed area than the first side 720) becomes greater than the applied force on the opposite side of the plunger piston 716 (from the compressed gas in the first side 720, which has a smaller exposed area, and the biasing force of the spring 728), the plunger 716 is extended from the outer housing 708 (FIG. 19B), opening the inlet/outlet port 744 to equalize the pressure of compressed gas in the first and second sides 720, 724. This moves the attached feeder arm 94F toward the driver channel 54F to reload another fastener into the driver channel 54F (FIG. 18B).

Figure 20:
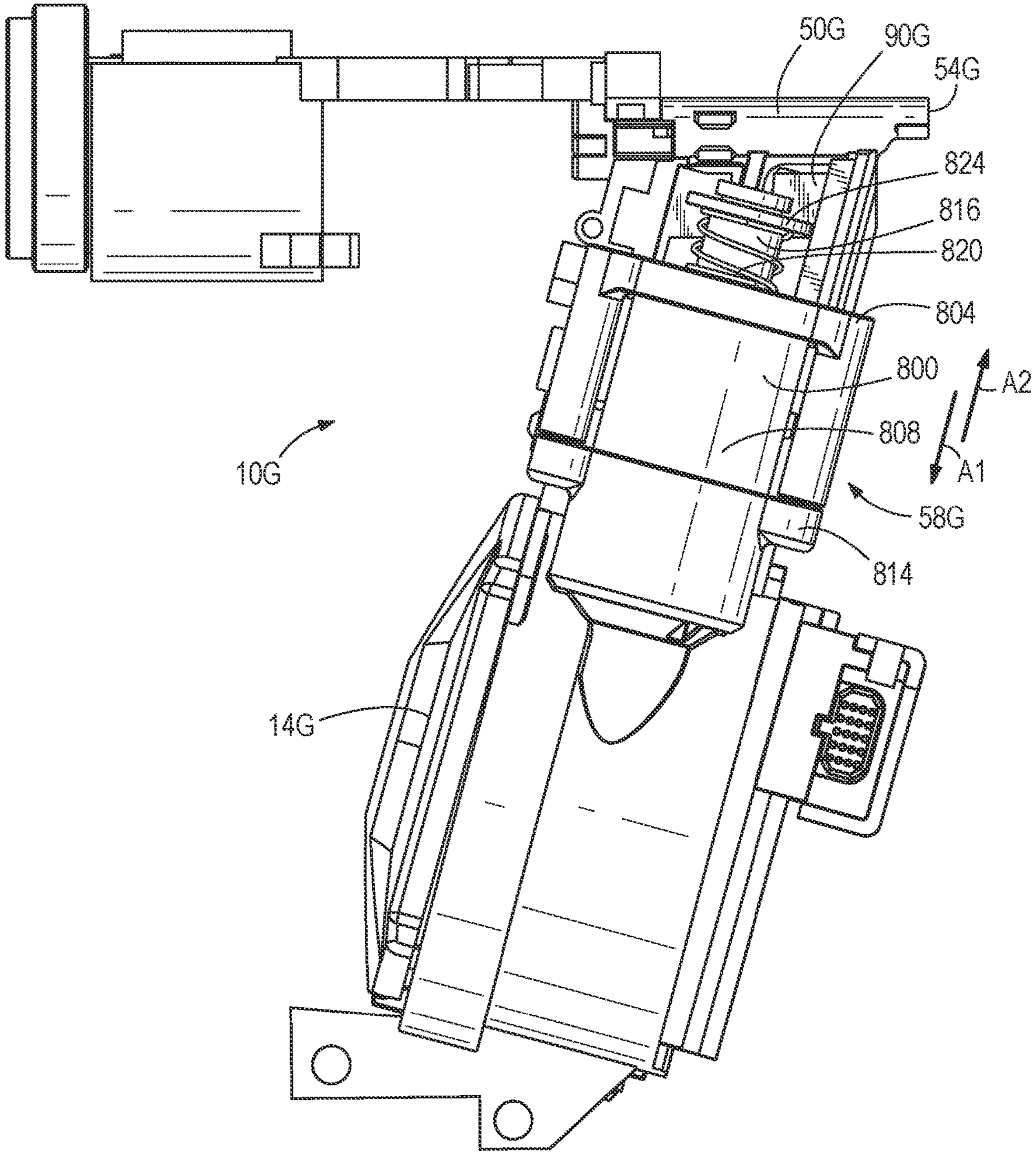
FIG. 20 is a plan view of a fastener driver according to another embodiment of the invention, with portions removed, illustrating a pusher mechanism.

FIG. 20 illustrates a gas spring-powered fastener driver 10G including another embodiment of a pusher mechanism 58G. The driver 10G is like the driver 10 described above with reference to FIGS. 1-8. Accordingly, features and elements of the driver 10G corresponding with features and elements of the driver 10 are given like reference numbers followed by the letter 'G.'

Figure 21:
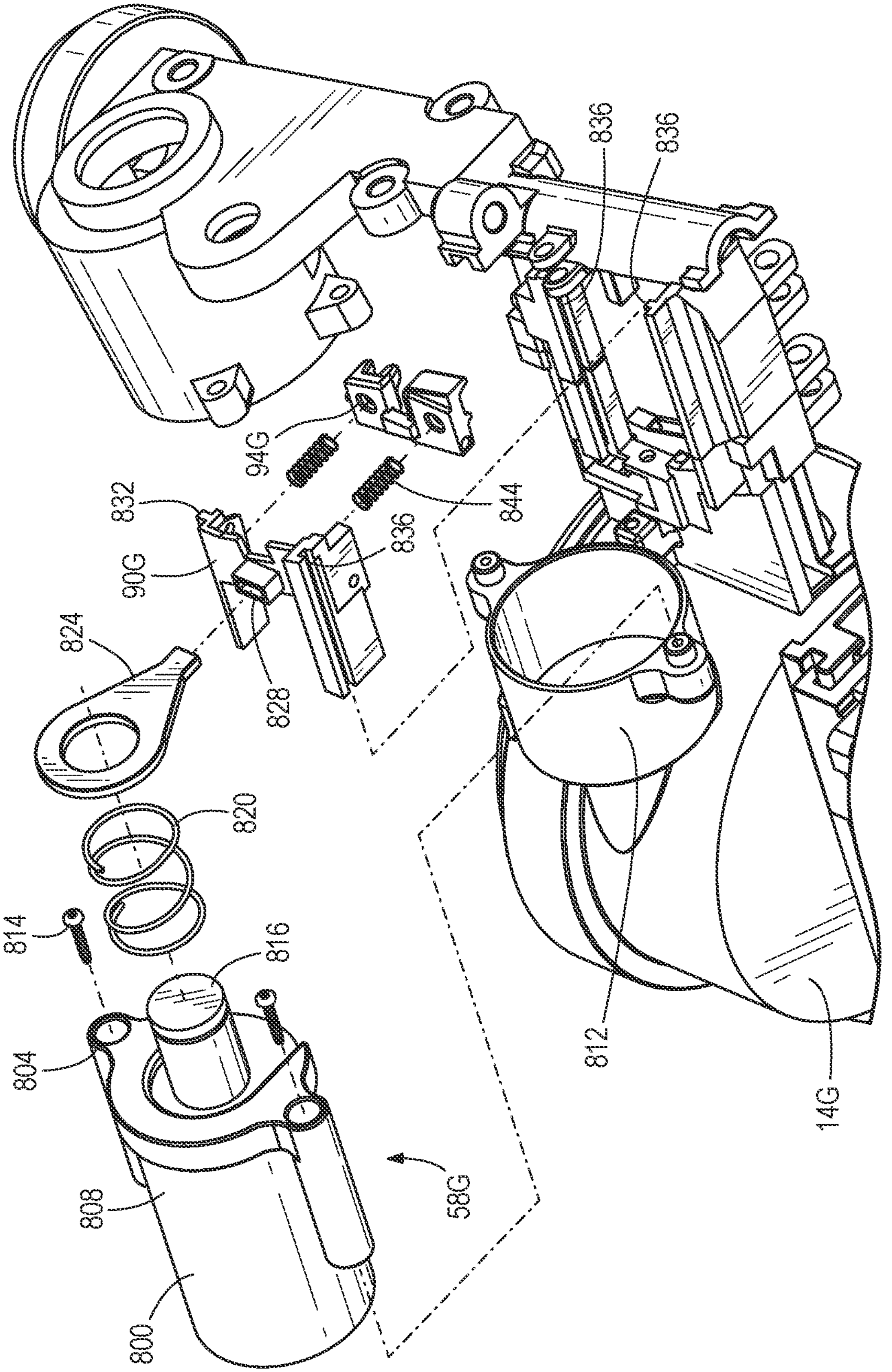
FIG. 21 is an exploded perspective view of the pusher mechanism of FIG. 20.

Like the driver 10, the driver 10G includes a lifting mechanism (not shown) that returns a piston (not shown) and a driver blade (not shown) to the ready position by energizing a motor (not shown). The pusher mechanism 58G differs from the pusher mechanism 58 in that the pusher mechanism 58G is driven by an electrical actuator using electrical energy from a battery pack 100 (FIG. 1). Particularly, the pusher mechanism 58G includes a solenoid 800 (FIG. 21) coupled to the canister magazine 14G via a bracket 804 clamping a solenoid housing 808 to a mount portion 812 of the canister magazine 14G. The bracket 804 is fastened to the mount portion 812 of the canister 14G via a plurality of fasteners 814 or the like. A plunger 816 is disposed within the solenoid housing 808 and is movable between an extended position and a retracted position. In the extended position, a plunger spring 820 disposed around the plunger 816 biases the plunger 816 from the solenoid housing 808. In the retracted position, the solenoid 800 is engaged, meaning an electromagnet attracts the plunger 816 within the solenoid housing 808, against the bias of the spring 820. A plate 824 is coupled to an end of the plunger 816 such that movement of the plunger 816 imparts reciprocating movement to the plate 824. The pusher mechanism 58G further includes a sliding body 90G, which has an opening 828 for receiving an end of the plate 824 to secure the body 90G to the plate 824. The motion of the sliding body 90G is constrained to reciprocating linear movement in the direction of arrows A1, A2 relative to the magazine 14G by engaged guide rails 832 and grooves 836. A feeder arm 94G is pivotably coupled to the sliding body 90G about a pivot axis 99G that is perpendicular to the direction of movement of the sliding body 90G along arrows A1, A2 and is biased toward the fasteners 48G by compression springs 844. Because the feeder arm 94G is supported upon the sliding body 90G, the feeder arm 94G reciprocates with the sliding body 90G in the direction of arrows A1, A2 in response to reciprocating movement of the plunger 816.

In operation, after the driver blade (not shown) strikes a fastener (not shown), the solenoid 800 is activated, retracting the plunger 816 and, thus, sliding the body 90G away from the driver channel 54G in the direction of A1, allowing the feeder arm to pivot to clear the next fastener in the sequence. When the plunger 816 is completely retracted, the body 90G is at a position farthest from the driver channel 54G allowing the springs to bias the feeder arm 94G behind the next fastener in the sequence. At this time, the solenoid 800 is deactivated, causing the plunger spring 820 to bias the plunger 816 outward. The outward motion of the plunger 816 moves the body 90G and, in turn, the feeder arm 94G toward the driver channel 54G. When the plunger 816 is completely extended, a forward most fastener is delivered to the driver channel 54G by the feeder arm 94G.

Figure 22:
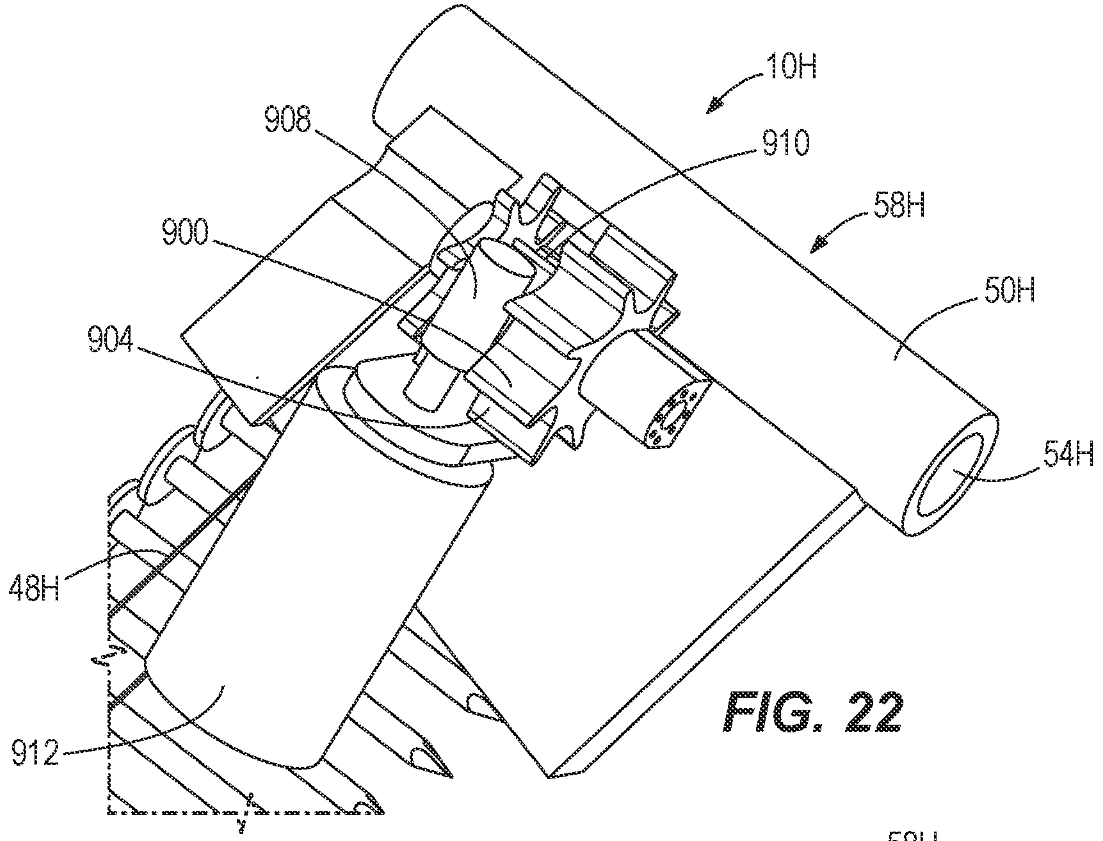
FIG. 22 is a plan view of a fastener driver according to another embodiment of the invention, with portions removed, illustrating a pusher mechanism.
Figure 23:
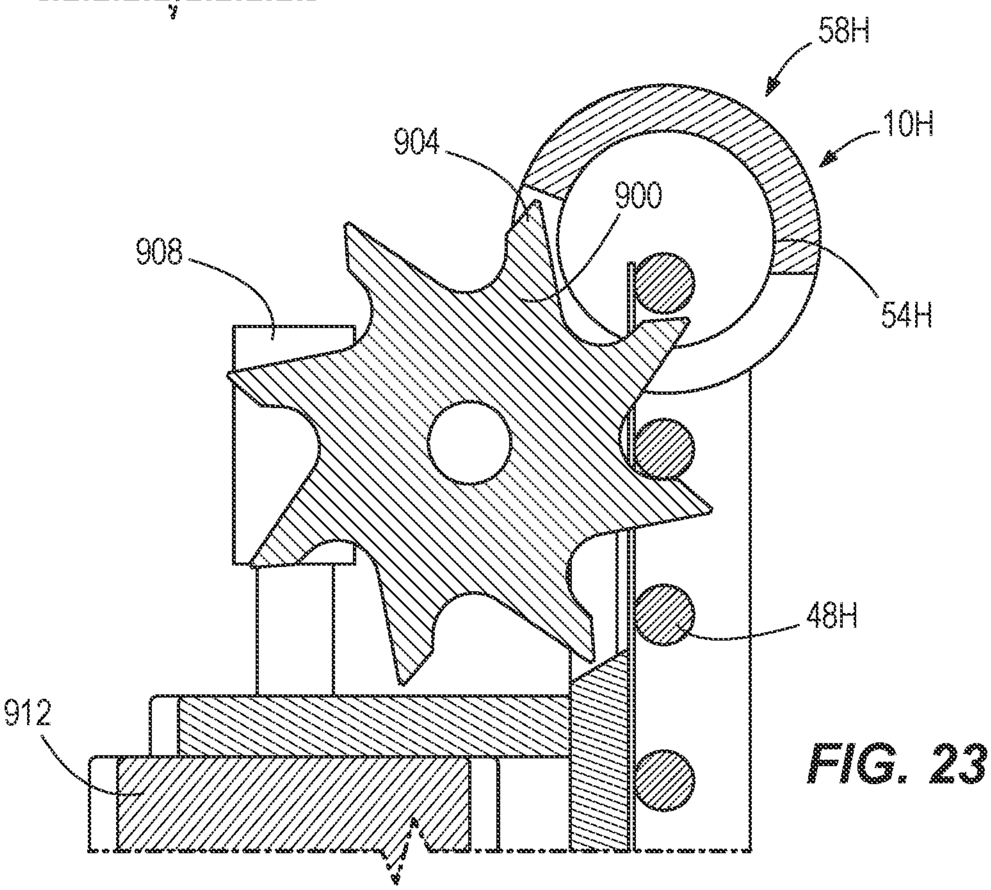
FIG. 23 is a plan view of the pusher mechanism of FIG. 22.

FIGS. 22 and 23 illustrates a gas spring-powered fastener driver 10H including another embodiment of a pusher mechanism 58H. The driver 10H is like the driver 10 described above with reference to FIGS. 1-8. Accordingly, features and elements of the driver 10H corresponding with features and elements of the driver 10 are given like reference numbers followed by the letter 'H.' In addition, the following description focuses primarily on differences between the pusher mechanism 58H and the pusher mechanism 58.

Like the driver 10, the driver 10H includes a lifting mechanism (not shown) that returns a piston (not shown) and a driver blade (not shown) to the ready position by energizing a motor (not shown). The pusher mechanism 58H differs from the pusher mechanism 58 in that the pusher mechanism 58H is driven by an electrical actuator using electrical energy from the battery pack 100 (FIG. 1). In particular, the pusher mechanism 58H includes an index wheel 900 that is rotatably coupled to the nosepiece 50H and that feeds collated fasteners 48H toward a drive channel 54H. The index wheel 900 includes a plurality of teeth 904 disposed concentrically about the index wheel 900. A worm gear 908 is configured to mesh with a driven gear 910 that is coupled with the index wheel 900. Rotation of the driven gear 910 via the worm gear 908 rotates the index wheel 900, thereby pushing the fasteners 48H forward with the arms 904 on the index wheel 900. In some embodiments, rotation is imparted to the worm gear 908 by an electric motor 912 that is separate from the motor driving the lifting mechanism. The motor 912 may be supported by a housing of the fastener driver 10H, the magazine 14H, or another component of the driver 10H. In other embodiments, rotation is imparted to the worm gear 908 by retraction of a work contact bracket in response to the work contact bracket abutting a workpiece and moving to a retracted position. In further embodiments, rotation is imparted to the worm gear 908 by a rebounding compression spring, which is configured to be compressed by a user.

In operation, the power source rotates the worm gear 908, which thereby rotates the driven gear 910 which, in turn, rotates the index wheel 900. A system determines when the power source rotates the worm gear 908. The system may actuate the worm gear 908, and thus the index wheel 900, based on a location of a driver blade 26H or, alternatively, based on a timing scheme. As the worm gear 908 is rotated, the worm gear 908 rotates the index wheel 900. The arms 904 of the index wheel 900 are disposed between adjacent fasteners 48H in the collated stripe, such that rotation of the index wheel 900 causes the fasteners 48H to be urged toward the drive channel 54H.

Although the invention has been described in detail with reference to certain preferred embodiments, variations and modifications exist within the scope and spirit of one or more independent aspects of the invention as described.

Various features of the invention are set forth in the following claims.

What is claimed is:

1. A powered fastener driver comprising:
- a housing;
- a nosepiece coupled to the housing and extending therefrom;
- a driver blade movable within the nosepiece between a ready position and a driven position;
- a canister magazine coupled to the nosepiece in which collated fasteners are receivable; and
- a pusher mechanism coupled to the nosepiece for individually transferring collated fasteners in the canister magazine to a driver channel in the nosepiece in which the driver blade is movable, wherein the pusher mechanism includes:
  - a feeder arm that is engageable with individual fasteners in the nosepiece for sequentially pushing each of the fasteners into the driver channel in response to movement of the feeder arm toward the driver channel, and
  - a linkage assembly positioned between the feeder arm and the driver blade, the linkage assembly including:
    - a pivot arm operatively coupled to the feeder arm, and a lever pivotably coupled to the pivot arm by a first pivot point, and wherein movement of the driver blade from the driven position toward the ready position causes each of the pivot arm and the lever to pivot about the first pivot point in a first rotational direction;
    - a first spring disposed between the pivot arm and the lever, wherein the first spring is configured to bias the lever into alignment with the pivot arm, and wherein the lever is configured to selectively move relative to the pivot arm about the first pivot point against the bias of the first spring in the first rotational direction as the driver blade moves from the driven position toward the ready position;

a support arm pivotably coupled to the housing by a second pivot point, wherein the lever is positioned between the pivot arm and the support arm, wherein each of the first pivot point and the second pivot point are fixed relative to the housing, wherein the support arm is pivotably coupled to the lever by a floating pivot point, and wherein the movement of the driver blade from the driven position toward the ready position causes the floating pivot point to move relative to the housing; and a finger pivotably coupled to the support arm by a third pivot point, and wherein the finger is selectively engageable with the driver blade;

wherein the linkage assembly is movable to advance the feeder arm toward the driver channel in response to contact with the driver blade as the driver blade moves from the driven position toward the ready position.

2. The powered fastener driver of claim 1, wherein the driver blade includes a rear surface and a fin extending therefrom, and wherein the finger is selectively engageable with the fin of the driver blade to move the linkage assembly.

3. The powered fastener driver of claim 2, wherein the linkage assembly further includes a second spring configured to bias the finger toward a first position, and wherein the engagement between the finger and the fin during movement of the driver blade from the ready position toward the driven position causes the finger to move toward a second position against the bias of the second spring.

4. The powered fastener driver of claim 2, wherein the fin includes a first surface inclined at an oblique angle relative to the rear surface of the driver blade and a second surface extending perpendicular from the rear surface of the driver blade, and wherein the finger is selectively engageable with each of the first surface and the second surface during movement of the driver blade between the driven position and the ready position.

5. The powered fastener driver of claim 1, wherein the linkage assembly further includes a third spring exerting a biasing force on the lever in a second rotational direction opposite the first rotational direction.

6. The powered fastener driver of claim 1, wherein the pivot arm is selectively movable in the first rotational direction about the first pivot point to move the feeder arm away from the driver channel.

7. The powered fastener driver of claim 6, wherein the pusher mechanism further includes a fourth spring exerting a biasing force on the pivot arm in a second rotational direction opposite the first rotational direction to move the feeder arm toward the driver channel.

8. The powered fastener driver of claim 6, wherein the pusher mechanism includes a body, wherein the feeder arm is coupled for movement with the body, and wherein the pivot arm is a fork configured to receive a protruding pin of the body for converting pivoting movement of the pivot arm into linear motion of the body and the feeder arm.

9. A powered fastener driver comprising:

a housing;

a nosepiece coupled to the housing and extending therefrom;

a driver blade movable within the nosepiece between a ready position and a driven position, the driver blade including a rear surface and a fin extending from the rear surface;

a canister magazine coupled to the nosepiece in which collated fasteners are receivable; and a pusher mechanism coupled to the nosepiece for individually transferring collated fasteners in the canister magazine to a driver channel in the nosepiece in which the driver blade is movable, wherein the pusher mechanism includes:

a feeder arm that is engageable with individual fasteners in the nosepiece for sequentially pushing each of the fasteners into the driver channel in response to movement of the feeder arm toward the driver channel, and a linkage assembly positioned between the feeder arm and the driver blade, the linkage assembly including;

a first member;

a second member pivotably coupled to the first member by a floating pivot point;

a third member operatively coupled between the first member and the feeder arm, wherein the third member is pivotably coupled to the first member by a first pivot point, and wherein movement of the driver blade from the driven position toward the ready position causes each of the first member and the third member to pivot about the first pivot point in a first rotational direction;

a first spring disposed between the first member and the third member, wherein the first spring is configured to bias the first member into alignment with the third member, and wherein the first member is configured to selectively move relative to the third member about the first pivot point against the bias of the first spring in the first rotational direction as the driver blade moves from the driven position toward the ready position; and a second spring exerting a biasing force on the first member in a second rotational direction opposite the first rotational direction;

wherein the second member is pivotably coupled to the housing by a second pivot point, wherein each of the first pivot point and the second pivot point are fixed relative to the housing, and wherein the floating pivot point is positioned between the first pivot point and the second pivot point, wherein the linkage assembly is movable to advance the feeder arm toward the driver channel in response to contact with the driver blade as the driver blade moves from the driven position toward the ready position, and wherein the floating pivot point is selectively movable relative to the housing by engagement between the fin and the linkage assembly as the driver blade moves from the driven position toward the ready portion thereby causing movement of the linkage assembly.

10. The powered fastener driver of claim 9, wherein the linkage assembly includes a finger operatively coupled to second member, and wherein the finger is selectively engageable with the fin of the driver blade.

11. The powered fastener driver of claim 10, wherein the linkage assembly further includes a third spring configured to bias the finger toward a first position, and wherein the engagement between the finger and the fin during movement of the driver blade from the ready position toward the driven position causes the finger to move toward a second position against the bias of the third spring.

12. The powered fastener driver of claim 9, wherein the fin includes a first surface inclined at an oblique angle relative to the rear surface of the driver blade and a second surface extending perpendicular from the rear surface of the driver blade, and wherein the linkage assembly is selectively engageable with each of the first surface and the second surface during movement of the driver blade between the driven position and the ready position.

* * * * *